United States Patent
Miyazaki

(10) Patent No.: US 7,077,483 B2
(45) Date of Patent: Jul. 18, 2006

(54) METHOD OF CONTROLLING ANTI-LOCK BRAKE SYSTEM FOR VEHICLES AND METHOD OF FINDING CONTROL POINT IN ABS

(75) Inventor: Nagao Miyazaki, Ikuno-ku (JP)

(73) Assignee: Japan Electronics Industry, Limited, Osaka (JP)

( * ) Notice: Subject to any disclaimer, the term of this patent is extended or adjusted under 35 U.S.C. 154(b) by 0 days.

(21) Appl. No.: 10/463,917

(22) Filed: Jun. 18, 2003

(65) Prior Publication Data
US 2003/0218379 A1   Nov. 27, 2003

Related U.S. Application Data

(63) Continuation of application No. 09/854,763, filed on May 14, 2001, now abandoned, which is a continuation of application No. 08/231,600, filed on Apr. 21, 1994, now Pat. No. 6,241,324.

(30) Foreign Application Priority Data

Apr. 21, 1993  (JP) ................................. 5-131504
Aug. 25, 1993  (JP) ................................. 5-247632

(51) Int. Cl.
  *B60T 8/60*  (2006.01)
  *B60T 8/52*  (2006.01)
(52) U.S. Cl. .................. 303/150; 303/112; 303/113.1; 188/181 T
(58) Field of Classification Search ................ 303/145, 303/150, 148, 113.1, 112, 157, 158; 701/70, 701/71, 73, 74, 78, 80; 188/181 R, 181 C, 188/181 T
See application file for complete search history.

(56) References Cited

U.S. PATENT DOCUMENTS

| | | | | |
|---|---|---|---|---|
| 4,671,579 A | * | 6/1987 | Sawano et al. | 303/150 |
| 4,881,784 A | * | 11/1989 | Leppek | 303/162 |
| 5,125,723 A | * | 6/1992 | Sakuma et al. | 303/156 |
| 5,186,042 A | * | 2/1993 | Miyazaki | 73/118.1 |
| 5,246,279 A | * | 9/1993 | Onaka et al. | 303/173 |
| 5,369,585 A | * | 11/1994 | Okubo | 701/80 |
| 6,241,324 B1 | * | 6/2001 | Miyazaki | 303/150 |

* cited by examiner

*Primary Examiner*—Thomas Williams
(74) *Attorney, Agent, or Firm*—Jordan and Hamburg LLP

(57) ABSTRACT

In an anti-lock brake system mounted on a vehicle wherein when the vehicle is braked in an emergency during running, an increase in the road surface friction force or road surface friction coefficient owing to an increase in the brake pressure is detected by a road surface friction force detecting device or road surface friction coefficient detecting device. The optimum control start point associated with an increase in the signal value of the road surface friction force F or road surface friction coefficient μ provided by the road surface friction force detecting device or road surface friction coefficient detecting device is decided by using a decrease in the wheel speed, i.e., by using the wheel speed ω or dω/dt. Thereafter, from the point where the specified value of control based on F or μ, or dF/dt or d μ/dt, the brake pressure is moved from the pressure increasing mode to the pressure retaining or decreasing mode.

9 Claims, 20 Drawing Sheets

METHOD OF CONTROLLING ANTI-LOCK BRAKE SYSTEM FOR VEHICLES AND METHOD OF FINDING CONTROL POINT IN ABS

BACKGROUND OF THE INVENTION

A first form of this invention relates to a method of controlling an anti-lock brake system for vehicles which prevents the locking of the wheels upon emergency braking of a vehicle, the method being characterized in that it uses the road surface friction force F or road surface friction coefficient μ, instead of slip factor used in the prior art, to control the system.

A second form of this invention relates to a method of finding a control point in an anti-lock brake system (ABS) for vehicles which prevents the locking of the wheels upon emergency braking of a vehicle, the method makes an errorless ABS control decision by using a road surface friction force detecting sensor or a road surface friction coefficient detecting sensor.

Method of Controlling Anti-Lock Brake System for Vehicles

Generally, conventional anti-lock brake systems for vehicles, e.g., automobiles, automatically control the brake operation such that the slip ratio falls in a given range on the basis of the vehicle speed and wheel speed (e.g., Japanese Patent Publication No. 30585/1984 and Japanese Patent Application Laid-Open Specification No. 61354/1985). The relation between road surface friction coefficient μ, and slip ratio can vary depending on the road surface conditions and for this reason the systems sometimes fail to provide a maximum brake pressure, in which case a minimum brake distance cannot be obtained. Further, since the vehicle speed is a value estimated from the wheel speed, there is a problem involving precision in the control of slip ratio. To accurately know the vehicle speed, there is a need for a complicated device, such as a ground-relative speed sensor (e.g., Japanese Patent Application Laid-Open Specification No. 64861/1988) or a vehicle deceleration sensor (e.g., Japanese Patent Application Laid-Open Specification No. 170157/1988). In the device described in Japanese Patent Application Laid-Open Specification No. 25169/1988, the torque of road surface friction force (tire torque) acting on the wheel is found by calculation from wheel angular acceleration and brake liquid pressure and that value of the tire torque at which the tire torque starts to decrease during the increase of the brake liquid pressure is employed as one of the factors for deciding the conditions immediately before the locking of the wheel. However, in this device, the tire torque is indirectly found by calculation from the wheel angular acceleration and brake liquid pressure and on account of the presence of uncertain constants such as brake efficiency and the moment of inertia of the wheel, there is a problem on precision. Further, since the pneumatic pressure in the tire of the wheel and the distance from the ground to the vehicle vary, there is also a problem that the ratio between the road surface friction force and the tire torque is not always maintained at a constant value.

In order to eliminate the drawback inherent in the conventional device described above, the present applicant has previously proposed, in Japanese Patent Application No. 197809/1989 (Japanese Patent Application Laid-open Specification No. 220056/1991), an anti-lock brake system for vehicles, comprising a strain gauge disposed in the vicinity of the axle, a load surface friction force detecting device having means for directly measuring shearing strains in the vicinity of the axle, and a vertical load detecting device, and means whereby in response to an output signal from a road surface friction coefficient detecting device having means for arithmetically processing detection signals from the two devices, the brake pressure is increased when the road surface friction force or road surface friction coefficient increases with increasing brake pressure or it is decreased when the road surface friction force or road surface friction coefficient decreases despite increasing brake pressure, and if the road surface friction force or road surface friction coefficient decreases with decreasing brake pressure, the brake pressure is increased again, such operations being repeated.

In the case where anti-lock brake control for vehicles is effected by using the system, it has been found that owing to disturbance sources such as vibrations of the tire and road surface during brake operation and the suspension, the signal value of the road surface friction force F or road surface friction coefficient μ sometimes fluctuates in a certain range, causing the accurate control start point to be mistaken.

Method of Detecting Control Point in ABS

Generally, conventional anti-lock brake systems for vehicles, e.g., automobiles, automatically control the brake operation such that the slip ratio falls in a given range on the basis of the vehicle speed and wheel speed (e.g., Japanese Patent Publication No. 30585/1984 and Japanese Patent Application Laid-Open Specification No. 61354/1985). The relation between road surface friction coefficient and slip ratio can vary depending on the road surface conditions and for this reason the systems sometimes fail to provide a maximum brake pressure, in which case a minimum brake distance cannot be obtained. Further, since the vehicle speed is a value estimated from the wheel speed, there is a problem on precision in the control of slip ratio. To accurately know the vehicle speed, there is a need for a complicated device, such as a ground-relative speed sensor (e.g., Japanese Patent Application Laid-Open Specification No. 64861/1988) or a vehicle deceleration sensor (e.g., Japanese Patent Application Laid-Open Specification No. 170157/1988). In the device described in Japanese Patent Application Laid-Open Specification No. 25169/1988, the torque of road surface friction force (tire torque) acting on the wheel is found by calculation from wheel angular acceleration and brake liquid pressure and that value of the tire torque at which the tire torque starts to decrease during the increase of the brake liquid pressure is employed as one of the factors for deciding the conditions immediately before the locking of the wheel. However, in this device, the tire torque is indirectly found by calculation from the wheel angular acceleration and brake liquid pressure and on account of the presence of uncertain constants such as brake efficiency and the moment of inertia of the wheel, there is a problem on precision. Further, since the pneumatic pressure in the tire of the wheel and the distance from the ground to the vehicle vary, there is also a problem that the ratio between the road surface friction force and the tire torque is not always maintained at a constant value.

In order to eliminate the drawback inherent in the conventional device described above, the present applicant has previously proposed, in Japanese Patent Application No. 197809/1989 (Japanese Patent Application Laid-open Specification No. 220056/1991), an anti-lock brake system for vehicles, comprising a strain gauge disposed in the vicinity of the axle, a load surface friction force detecting device having means for directly measuring shearing strains in the vicinity of the axle, and a vertical load detecting device, and means whereby in response to an output signal from a road surface friction coefficient detecting device having means for arithmetically processing detection signals from the two devices, the brake pressure is increased when the road surface friction force or road surface friction coefficient increases with increasing brake pressure or it is decreased when the road surface friction force or road surface friction coefficient decreases despite increasing brake pressure, and if the road surface friction force or road surface friction coefficient decreases with decreasing brake pressure, the brake pressure is increased again, such operations being repeated.

In the case where anti-lock brake control for vehicles is effected by using the above system, it has been found that owing to crosstalk such as brake torque contained in sensor signals, the accurate control start point can often be mistaken.

SUMMARY OF THE INVENTION

Method of Controlling Anti-Lock Brake System for Vehicles

In view of the problem inherent in the anti-lock brake system for vehicles according to the prior art described above, the present invention has for its object the provision of a method of controlling an anti-lock brake system for vehicles, the method being improved to effect stabilized control by eliminating disturbance sources in the vicinity of the optimum control start point concomitant with the increase of the signal value of the road surface friction force F or road surface friction coefficient $\mu$ or by confining disturbance sources associated with the optimum control start point in a range of given width, the method preventing the brake pressure from being unnecessarily decreased.

In accordance with a first embodiment there is provided a method of controlling an anti-lock brake system for vehicles wherein when a vehicle having an anti-lock brake system mounted thereon has the emergency brake applied thereto, a change in the road surface friction force or road surface friction coefficient due to the increased brake pressure is detected by a road surface friction force detecting device or a road surface friction coefficient detecting device, the method being characterized in that to decide the optimum control start point concomitant with the increase of the signal value of the road surface friction force F or road surface friction coefficient $\mu$ detected by the road surface friction force detecting device or road surface friction coefficient detecting device, use is made of means for eliminating disturbance sources which impede such decision. Accordingly, eliminating disturbance sources in the vicinity of the optimum control start point concomitant with the increase of the signal value of the road surface friction force F or road surface friction coefficient $\mu$ or confining disturbance sources associated with the optimum control start point in a range of given width ensures that there is no unnecessary decrease in brake pressure and that efficient and stabilized control is effected.

In accordance with a second embodiment there is provided a method of controlling an anti-lock brake system for vehicles, wherein when a vehicle having an anti-lock brake system mounted thereon has the emergency brake applied thereto, a change in the road surface friction force or road surface friction coefficient due to the increased brake pressure is detected by a road surface friction force detecting device or a road surface friction coefficient detecting device, the method being characterized in that the optimum control start point concomitant with the increase of the signal value of the road surface friction force F or road surface friction coefficient $\mu$ due to the increased brake pressure detected by the road surface friction force detecting device or road surface friction coefficient detecting device is decided by a drop in the wheel speed, that is, by using the wheel speed or $d\omega/dt$, and then from the point where the specified value of control by F or $\mu$ or by $dF/dt$ or $d\mu/dt$ is reached, the brake pressure is shifted from the pressure increasing mode to the pressure retaining or decreasing mode, so as to eliminate disturbance sources. Accordingly, a drop in the wheel speed is decided by the wheel speed $\omega$ or $d\omega/dt$ and the optimum control start point concomitant with the increase of the signal value of the road surface friction force F or road surface friction coefficient $\mu$ is specified, thereby providing the optimum control start point free from the influences of disturbance sources during ABS control.

In accordance with a third embodiment there is provided a method of controlling an anti-lockbrake system for vehicles wherein when a vehicle having an anti-lockbrake system mounted thereon has the emergency brake applied thereto, a change in the road surface friction force or road surface friction coefficient due to the increased brake pressure is detected by a road surface friction force detecting device or a road surface friction coefficient detecting device, the method being characterized in that the optimum control start point concomitant with the increase of the signal value of the road surface friction force F or road surface friction coefficient $\mu$ due to the increased brake pressure detected by the road surface friction force detecting device or road surface friction coefficient detecting device is decided by a drop in the vehicle acceleration decided by $dV/dt$ using an acceleration sensor, and then from the point where the specified value of control by F or $\mu$ or by $dF/dt$ or $d\mu/dt$ is reached, the brake pressure is shifted from the pressure increasing mode to the pressure retaining or decreasing mode, so as to eliminate disturbance sources. Accordingly, a drop in the vehicle acceleration is decided by $dV/dt$ using an acceleration sensor and then the optimum control start point concomitant with the increase of the road surface friction force F or road surface friction coefficient $\mu$ is designated, thereby providing the optimum control start point free from the influences of disturbance sources during ABS control.

In accordance with a fourth embodiment, a method of controlling an anti-lock brake system for vehicles is provided wherein when a vehicle having an anti-lock brake system mounted thereon has the emergency brake applied thereto, a change in the road surface friction force or road surface friction coefficient due to the increased brake pressure is detected by a road surface friction force detecting device or a road surface friction coefficient detecting device, the method being characterized in that the optimum control start point concomitant with the increase of the signal value of the road surface friction force F or road surface friction coefficient $\mu$ detected by the road surface friction force detecting device or road surface friction coefficient detecting device is decided by both the wheel speed $\omega$ or $d\omega/dt$ and $dV/dt$, and then from the point where the specified value of control by F or $\mu$ or by $dF/dt$ or d $\mu/dt$ is reached, the brake pressure is shifted from the pressure increasing mode to the pressure retaining or decreasing mode, so as to eliminate disturbance sources. According to the fourth embodiment, a drop in the wheel speed is decided by the wheel speed $\omega$ or $d\omega/dt$ and a drop in the vehicle acceleration is decided by $dV/dt$ using an acceleration sensor and then the optimum control start point concomitant with the increase of the road surface friction force F or road surface friction coefficient $\mu$ is designated, thereby providing the optimum control start point free from the influences of disturbance sources during ABS control.

In accordance with the second through fourth embodiments, a drop in the wheel speed during brake operation is detected by the specified value of ω or by dω/dt so as to provide a control start point or a drop in the vehicle speed is detected by dV/dt so as to provide a control start point or detected by both to be decided as the control start point; therefore, the optimum control start point is obtained without being influenced by disturbance sources such as vibrations between the tire and road surface during brake operation and the suspension, thus enabling accurate control to be effected using F or μ.

In accordance with a fifth embodiment, a method of controlling an anti-lock brake system for vehicles according to the first through fourth embodiments is further characterized in that in the pressure decreasing mode subsequent to the retaining mode or after moving to the pressure decreasing mode, the brake pressure is shifted from the pressure decreasing mode to the pressure increasing mode by a pressure decreasing threshold value, a set value of a specified value of elapsed time or a decision circuit or by a combination of two or more of such factors, so as to eliminate disturbance sources. According to the fifth embodiment, any one of the above control methods of the first through fourth embodiments is used to shift the brake pressure from the pressure increasing mode to the retaining mode or pressure decreasing mode and then the brake pressure is shifted from the pressure decreasing mode to the pressure increasing mode by a pressure decreasing threshold value, a set value of a specified value of elapsed time or a decision circuit or by a combination of two or more of such factors, so as to eliminate disturbance sources, thus effecting ABS control.

According to a sixth embodiment, a method of controlling an anti-lock brake system for vehicles, characterized in that during travel of a vehicle having an anti-lock brake system, the first brake pressure control is effected by using any of the control methods of the first through fourth embodiments, and then at the point of time when the control method of the fifth embodiment is completed, the control is continuously repetitively effected by using any of the control methods of the first through fourth embodiments or the fifth embodiment, until the vehicle stops or in and after the second time the control is continuously repetitively effected by using F or μ, or dF/dt or dμ/dt alone and the control method of the fifth embodiment using the pressure decreasing threshold value until the vehicle stops, thus eliminating disturbance sources.

According to the invention of the sixth embodiment, the first brake pressure control is effected by using any of the above control methods of the first through fourth embodiments, and then after the brake pressure has been shifted from the pressure increasing mode to the retaining or pressure decreasing mode, the brake pressure is shifted from the pressure decreasing mode to the pressure increasing mode by a pressure decreasing threshold value, a set value of a specified value of elapsed time or a decision circuit or by a combination of two or more of such factors, whereupon the control is continuously repetitively effected until the vehicle stops or after the second time the control is continuously repetitively effected using F or μ, or dF/dt or dμ/dt alone and the control method of the fifth embodiment until the vehicle stops.

According to the fifth and sixth embodiments, after any of the operations described in the second through fourth embodiments has been performed and the brake pressure has been shifted to the pressure decreasing mode, the control is continuously repetitively effected in which the brake pressure is shifted from the pressure decreasing mode to the pressure increasing mode by a pressure decreasing threshold value, a set value of a specified value of elapsed time or a decision circuit or by a combination of two of such factors, or in and after the second time the control is continuously repetitively effected using F or μ or dF/dt or dμ/dt alone and the aforesaid control method; therefore, the shift of the brake pressure from the pressure decreasing mode to the pressure increasing mode is continuously repetitively effected until the vehicle stops, so that disturbance in the vicinity of the F or μ brake optimum value can be eliminated.

According to a seventh embodiment, a method of controlling an anti-lock brake system for vehicles is provided wherein when a vehicle having an anti-lock brake system mounted thereon has the emergency brake applied thereto, a change in the road surface friction force or road surface friction coefficient due to the increased brake pressure is detected by a road surface friction force detecting device or a road surface friction coefficient detecting device, the method being characterized in that after the maximum value of the signal value of the road surface friction force F or road surface friction coefficient μ detected by the road surface friction detecting device or road surface friction coefficient detecting device has been ascertained, fixed lower limits are provided for the approximate maximum F value or approximate maximum μ value and the maximum F value or maximum μ value and the brake pressure is controlled such that F or μ is stably retained in the range, thus eliminating disturbance sources. Using the upper and lower limits, the method is not influenced by fluctuations in the F or μ value caused by disturbance and the brake pressure maintains approximately the maximum F value or maximum μ value without any unnecessary decrease in brake pressure, so that efficient and stabilized control can be effected.

An eighth embodiment of the invention includes a method of controlling an anti-lock brake system for vehicles wherein when a vehicle having an anti-lock brake system mounted thereon has the emergency brake applied thereto, a change in the road surface friction force or road surface friction coefficient due to the increased brake pressure is detected by a road surface friction force detecting device or a road surface friction coefficient detecting device, the method being characterized in that after the maximum value of the signal value of the road surface friction force F or road surface friction coefficient μdetected by the road surface friction detecting device or road surface friction coefficient detecting device has been ascertained, fixed lower limits are provided for the approximate maximum F value or approximate maximum μ value and the maximum F value or maximum μ value and the brake pressure is controlled by being increased or decreased in the range in which F or μ is retained, thus eliminating disturbance sources. Accordingly, the brake pressure is retained between the maximum F value or maximum μ value and the F value or μ value which is in the disturbance range, and efficient and stabilized control is effected without any unnecessary decrease in brake pressure.

According to the seventh and eighth embodiments, in contrast to the fact that in the conventional control method, in order to prevent the locking of the wheel in the vicinity of the limit of brake force in the possession of a road surface, it has been necessary to once decrease the brake pressure to decrease the brake force on the road surface, the present invention makes it unnecessary to decrease the pressure, enabling the brake pressure to be retained in the vicinity of the maximum value of brake force in the possession of the road surface. Thereby, the brake distance for the emergency brake can be decreased, improving the safety of the vehicle.

A ninth embodiment includes a method of controlling an anti-lock brake system for vehicles, characterized in that in the seventh and eighth embodiments, variations in F or μ with respect to brake pressure are monitored and when the upper limit of brake pressure in a preset control range is reached, if F or μ exceeds the previous maximum F or maximum μ, the brake pressure is further increased to ascertain the maximum μ again, where after the above-mentioned brake pressure control is effected, thus eliminating disturbance. During control according to the control method of the seventh and eighth embodiments using upper and lower limits, if the F value or μ value obtained from the road surface increases, that is, when the vehicle moves from a slippery road surface to a less slippery road surface, the brake force obtained from the road surface is efficiently used to shorten the brake distance.

According to the ninth embodiment, in contrast to the fact the conventional control method has no means for knowing the vehicle having moved to a road surface which provides a higher road surface brake force during anti-lock brake operation, the change of the road surface can be detected with good responsiveness to retain the optimum brake pressure. Thereby, the road surface brake force which can be primarily acquired is effectively used to shorten, thus improving the safety of the vehicle.

According to a tenth embodiment, a method of controlling an anti-lock brake system for vehicles is provided, uses the above upper and lower limit methods and, characterized in that in the methods of the seventh and eighth embodiments, variations in F or μ with respect to brake pressure are monitored and if the F value or μ value decreases with respect to the brake pressure in a preset brake pressure control range, the brake pressure is rapidly decreased to ascertain the maximum μ again, thus effecting control to eliminate disturbance. According to the embodiment of the tenth embodiment during control according to the control method of the seventh and eighth embodiments, if the F value or μ value obtained from the road surface decreases, that is, when the vehicle moves a more slippery road surface, the brake force is rapidly decreased to avoid locking and the optimum brake pressure control on the road surface in question is effected.

According to the tenth embodiment, in contrast to the fact that the conventional control method makes the detection only when the wheel actually starts to be locked, the detection is made in the stage where the wheel is supposed to start to be locked, making it possible to start adjusting the brake pressure in the early period, thus eliminating the need for adjusting excessive brake pressure resulting from delayed decision, so that the optimum brake pressure control can be effected.

An eleventh embodiment provides a method of controlling an anti-lockbrake system for vehicles, characterized in that in the case where the maximum value of the signal value of the road surface friction force F or road surface friction coefficient μ detected by the road surface friction force detecting device or road surface friction coefficient detecting device can hardly be ascertained, quasi-F or quasi-μ is found between the maximum F value or maximum μ value and the minimum F value or minimum μ value within a given period of time, and the brake pressure control is effected corresponding to such quasi-F or quasi-μ, thus eliminating disturbance sources. Therefore, stabilized brake pressure control can be effected even on a road surface which causes vigorous vibrations, such as an undulating road surface.

A twelfth embodiment further provides a method of controlling an anti-lock brake system for vehicles using the above quasi-F and quasi-μ methods of the eleventh embodiment, where in the case where the value between the maximum F value or maximum μ value and the minimum F value or minimum μ value within a given period of time varies beyond the allowable range, the individual values are measured again within a given period of time to newly find quasi-F or quasi-μ and the brake pressure control is effected corresponding to such quasi-F or quasi-μ, thus eliminating disturbance sources. Therefore, optimum brake pressure control can be effected even on a road surface which causes vigorous vibrations, such as an undulating road surface.

A thirteenth embodiment further provides a method of controlling an anti-lock brake system for vehicles, using the above quasi-F and quasi-μ methods of the eleventh and twelfth embodiments, where in the case where the maximum μ can be ascertained, control is effected according to the control methods described above using fixed limits of the seventh through tenth embodiments thus eliminating disturbance sources. Thus, effective stabilized anti-lock brake control can be effected even on a road surface which causes vigorous vibrations, such as an undulating road surface.

Furthermore, according to the methods of the eleventh and thirteenth embodiments using quasi values, stabilized anti-lock brake control can be effected even on a road surface where the detected value of F or μ are high in variation, such as an undulating road surface.

Method of Detecting Control Point in ABS

In view of the above problems inherent in the anti-lock brake systems for vehicles according to the prior art, the invention has for its object the provision of a method of detecting a control point which enables normal ABS control even if a sensor is subject to crosstalk or the like is used. The present invention further provides the following embodiments.

The invention includes a method of a fourteenth embodiment detecting a control point in an ABS having a stress sensor which provides an output proportional to the road surface friction F or road surface friction coefficient μ having mixed therein a crosstalk component, such as brake torque T, and to the brake torque T, the method being characterized in that it uses adjusting means for making adjustment from the rise of the brake start such that detected signals of F or μ and T are adjusted in ratio or made equal in value, and decision means for deciding the control point by a change in the ratio or in adjustment coefficient, wherein the timing of the control point is detected by the size of a change in the ratio of detected signals of F or μ and T or in adjustment coefficient. According to the fourteenth embodiment, in order to detect the timing of the control point, the detected signals of F or μ and T are adjusted in ratio or made equal in value from the rise of the brake start and the control point is calculated by the size of the change in ratio or in adjustment coefficient; thus, the control point which is not influenced by crosstalk or the like can be obtained.

The invention further provides is a method of a fifteenth embodiment detecting a control point in an ABS, characterized in that in the decision means of the fourteenth embodiment using the ratio, a point in time when the ratio of F or μ and T or adjustment coefficient substantially stops changing is decided to be the control timing. Thereby, the control point which is not influenced by crosstalk or the like can be obtained.

The invention still further provides a method of a sixteenth embodiment detecting a control point in an ABS, characterized in that in the decision means the fourteenth embodiment using the above ratio, a, the point in time when the ratio of F or μ and T or the adjustment coefficient, during brake pressure decreasing control, becomes substantially equal to the value obtained upon completion of the preceding brake pressure decreasing control is decided as the completion of the brake pressure decreasing control, the point in time being decided to be the optimum control timing for ABS. Thereby, the control point which is not influenced by crosstalk or the like can be obtained.

The invention also provides a method of a seventeenth embodiment of detecting a control point in an ABS, characterized in that in the decision means using the above ratio, a point in time when the ratio of F or μ and T or the adjustment coefficient, during the brake pressure decreasing control, becomes above the value obtained during the first brake pressure decreasing control is decided to be the completion of the brake pressure decreasing control, the point in time being decided to be the optimum control timing for the ABS. Thereby, the control point which is not influenced by crosstalk or the like can be obtained.

The invention further includes a method an eighteenth embodiment of detecting a control point in an ABS, characterized in that in the decision means using the above ratio, a point of time when the ratio of F or μ and T or the adjustment coefficient, during the brake pressure decreasing control, starts to increase is decided to be the completion of the brake pressure decreasing control, the point in time being decided to be the optimum control timing for the ABS. Thereby, the control point which is not influenced by crosstalk or the like can be obtained.

The invention still further includes a method of a nineteenth embodiment of detecting a control point in an ABS, characterized in that in the decision means of the fourteenth embodiment using the ratio, a point in time when the ratio of F or μ and T or the adjustment coefficient, except during the brake pressure decreasing control, becomes just above the value obtained during the first brake pressure decreasing control is saluted as the start of brake pressure decreasing control, the point in time being decided to be the optimum control timing for the ABS. Thereby, the control point which is not influenced by crosstalk or the like can be obtained.

The invention yet still further a method of a twentieth embodiment of detecting a control point in an ABS, characterized in that in the decision means of the fourteenth embodiment a point in time when the ratio of F or μ and T or the adjustment coefficient, during the brake pressure retaining control, becomes greater than the value obtained during the first brake pressure decreasing control is decided to be the start of brake pressurization control, the point being decided to be the optimum control timing for the ABS. Thereby, the control point which is not influenced by crosstalk or the like can be obtained.

The invention also provides, a method of a twenty first embodiment of detecting the control point in an ABS, characterized in that in the decision means of the fourteenth embodiment using the ratio, a point in time when the ratio of F or μ and T or the adjustment coefficient, during the brake pressure retaining control, becomes smaller than the value obtained during the first brake pressure decreasing control and becomes further smaller is decided to be the start of brake pressure decreasing control, the point being decided to be the optimum control timing for the ABS. Thereby, the control point which is not influenced by crosstalk or the like can be obtained.

The invention additionally provides is a method of a twenty second embodiment of detecting the control point in an ABS, characterized in that in the decision means of the fourteenth embodiment using the ratio, a point in time when the ratio of F or μ and T or the adjustment coefficient, during the brake pressure retaining control, becomes smaller than the value obtained during the first brake pressure decreasing control and is stabilized is decided to be continuation of pressure retention or the start of control of gentle increase of pressure, the point in time being decided to be the optimum control timing for the ABS. Thereby, the control point which is not influenced by crosstalk or the like can be obtained.

According to the invention of the fourteenth through twenty second embodiments, to detect the timing for control point, the detected signal of F or μ and T are adjusted in ratio or made equal in value from the rise of brake start and the control point can be calculated from the size of the change in the ratio or adjustment coefficient to provide the control point which is not influenced by crosstalk or the like; therefore, using the detected value as such which has a crosstalk component such as brake torque which is difficult to eliminate when detecting the road surface friction force F or road surface friction coefficient μ, it is possible to find the accurate control point, and in ABS control in which safety is the most important factor, the probability of erroneous decision can be minimized.

The invention further provides a method of a twenty third embodiment of detecting the control point in an ABS having a stress sensor which provides an output proportional to the road surface friction F or road surface friction coefficient μ having mixed therein a crosstalk component, such as brake torque T, and to the brake torque T, the method being characterized in that it uses adjusting means for adjusting the ratio of detected signals of F or μ and T, and decision means for deciding the control point by a change in F-T value from its value after adjustment, wherein the timing for the control point is detected by the change in the F-T value. Accordingly, in order to detect the timing for the control point, and T, the timing for the control point is calculated and decided by a change in the F-T value during brake control and thus the crosstalk component T, which is originally a noise, is positively utilized to provide the optimum control point.

The invention described further provides is a method of a twenty fourth embodiment of detecting the control point in an ABS having a stress sensor which provides an output proportional to the road surface friction force F or road surface friction coefficient μ and the brake torque T, the method being characterized in that the timing for the control point is detected by a change in the F-T value during brake control. Accordingly, in order to detect the timing for the control point, and T, the timing for the control point is calculated and decided by a change in F-T value during brake control and thus the crosstalk component T, which is originally a noise, is positively utilized to provide the optimum control point.

The invention still further provides a method of a twenty fifth embodiment of detecting the control point in an ABS, characterized in that in the decision means of the twenty third and twenty fourth embodiments, a threshold value for the F-T value is provided to decide the control point in control. Accordingly, to detect the timing for the control point, a threshold value for the F-T value is provided during brake control to decide the timing in control or decide the timing for the control of F, N, ΔF, ΔN, thereby eliminating the influences of noise.

The invention further includes a method of a twenty sixth embodiment of detecting the control point in an ABS, characterized in that in the threshold value of the twenty fifth embodiment, a change in the F-T threshold value is corrected as the road surface friction coefficient changes, thereby detecting the timing for the control point. Accordingly, in order to detect the timing for the control point, a threshold value is used for the F-T value to correct the threshold value for the F-T value as the road surface friction coefficient changes, so as to decide the timing for the control point; thus, as the vehicle speed changes from high to low value, the threshold value is decreased according as the road surface friction coefficient decreases, thereby providing the optimum control point.

In the invention of the twenty third through twenty sixth embodiments, the T value which is originally a noise inherent in a sensor used in the invention is used in the form of F-T, whereby without using a gear-like wheel speed sensor used in conventional ABSs, hybrid control can be effected which uses both slip control with higher response and control decision based on F or μ according to a second embodiment of the invention. The present invention will now be described in more detail with reference to embodiments thereof shown in the drawings.

DESCRIPTION OF THE PREFERRED EMBODIMENTS

Method of Controlling Anti-Lock Brake System for Vehicles

In accordance with a first embodiment there is provided a method of controlling an anti-lock brake system for vehicles wherein when a vehicle having an anti-lock brake system mounted thereon has the emergency brake applied thereto, a change in the road surface friction force or road surface friction coefficient due to the increased brake pressure is detected by a road surface friction force detecting device or a road surface friction coefficient detecting device, the method being characterized in that to decide the optimum control start point concomitant with the increase of the signal value of the road surface friction force F or road surface friction coefficient μ detected by the road surface friction force detecting device or road surface friction coefficient detecting device, use is made of means for eliminating disturbance sources which impede such decision. Accordingly, eliminating disturbance sources in the vicinity of the optimum control start point concomitant with the increase of the signal value of the road surface friction force F or road surface friction coefficient μ or confining disturbance sources associated with the optimum control start point in a range of given width ensures that there is no unnecessary decrease in brake pressure and that efficient and stabilized control is effected.

Figure 1:
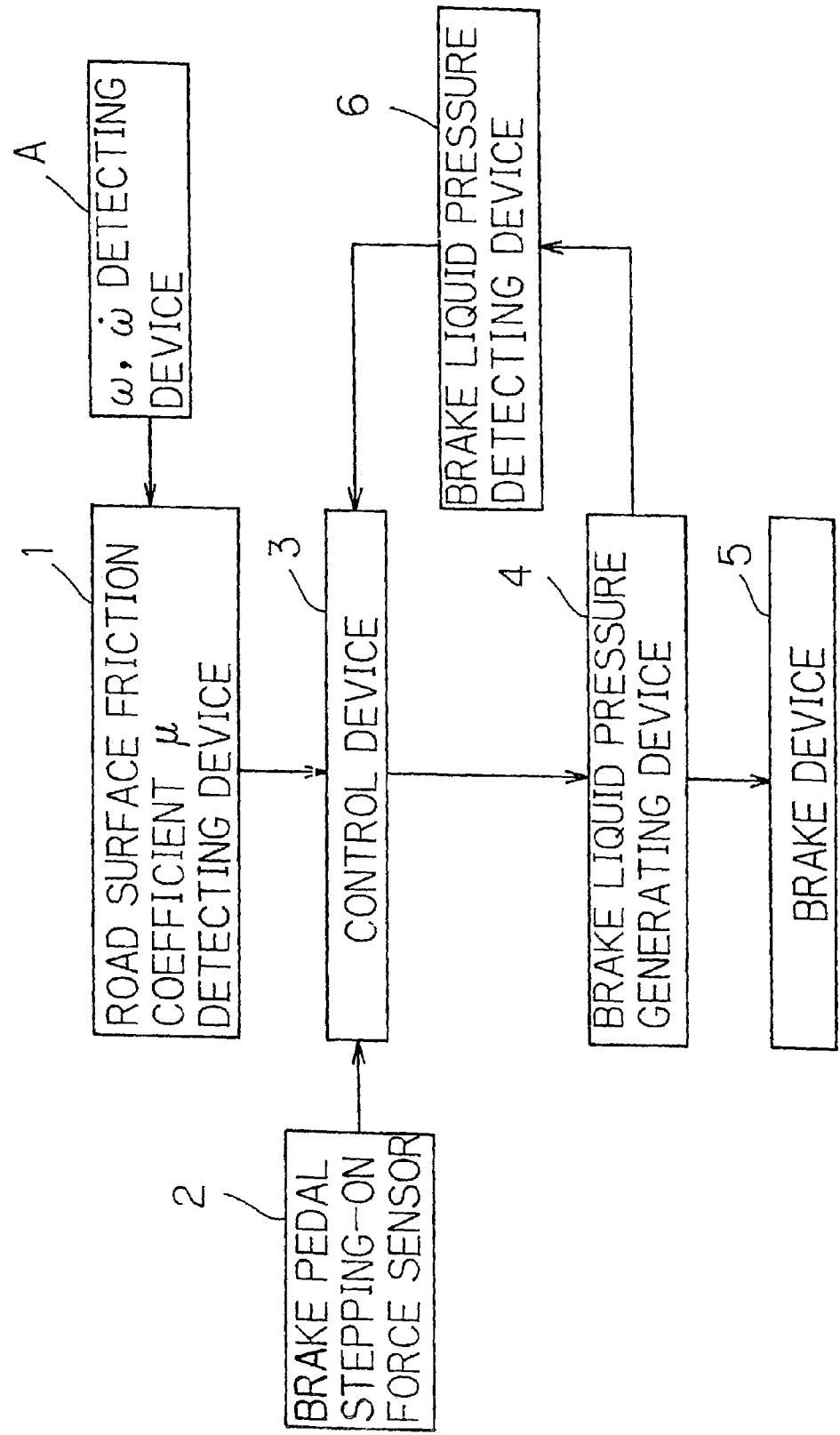
FIG. 1 is a block diagram showing an example of a hard arrangement for a control method for an anti-lock brake system for vehicles according to a second embodiment of the present invention.

FIG. 1 is a block diagram showing an example of a hard arrangement for a control method for an anti-lock brake system for vehicles using the road surface friction coefficient according to a second embodiment of the present invention. In the figure, the character A denotes an ω, ω̇ detecting device; 1 denotes a road surface friction coefficient μ detecting device; 2 denotes a brake pedal stepping-on force sensor; 3 denotes a control device; 4 denotes a brake liquid pressure generating device; 5 denotes a brake device; and 6 denotes a brake liquid pressure detecting device. The control device 3 is composed of electronic circuits including a microprocessor, a memory and an input/output interface, and is adapted to operates according to a program written in the memory in advance.

In the case where anti-brake system (ABS) control is effected using a road surface friction coefficient μ the optimum control start point is often misunderstood owing to disturbance sources such as vibrations produced in the tire and road surface during braking, and the suspension. To eliminate this disturbance in the vicinity of the μ control optimum value to obtain the optimum control start point, in this example, the drop in the wheel speed owing to braking is detected by a predetermined value of ω or μ defined by $$\mu = \frac{d\omega/dt}{N}$$

and using this as the control start point, the known ABS control method is effected using μ.

As for the specified value of ω, in the case where the value at the start of measurement is ω1 and the value at the specified time is ω2, the specified value is expressed by $$\frac{\omega 1 - \omega 2}{\omega 1} \geq 0.03 \text{ to } 0.2$$

Expressed using $d\omega/dt$, from the equation of wheel motion, $$I\, d\omega/dt = \mu \cdot N \cdot r \cdot T_B$$

In the above equation, I is the wheel inertia, N is the wheel load, r is the wheel radius, $T_B$ is the brake torque, and $\mu$ is the friction coefficient.

In addition, the brake torque $T_B$ is found from $$T_B = 2 \cdot \mu_P \cdot B \cdot A \cdot P_w.$$

In this equation, $\mu_P$ is the friction coefficient between the brake disk and pad, B is the effective radius of the pad, $P_w$ is the brake oil pressure.

Since I and r can be regarded as constants, $$\mu \approx \frac{d\omega/dt + TB}{N}$$

and this $\mu$ is used.

The derivative $d\omega/dt$ is detected by the wheel speed sensor now in use, N is measured by a vertical load sensor mounted on the suspension, and $T_B$ is calculated by the above equation. In addition, if the known eliminating means is used, since the need for considering the crosstalk with respect to the output from the F sensor measured as a sensor component $T_B$ by the $\mu$ sensor is decreased, $\mu$ can be calculated by this equation. The proper range around this maximum value is taken as the optimum control start point.

Figure 2:
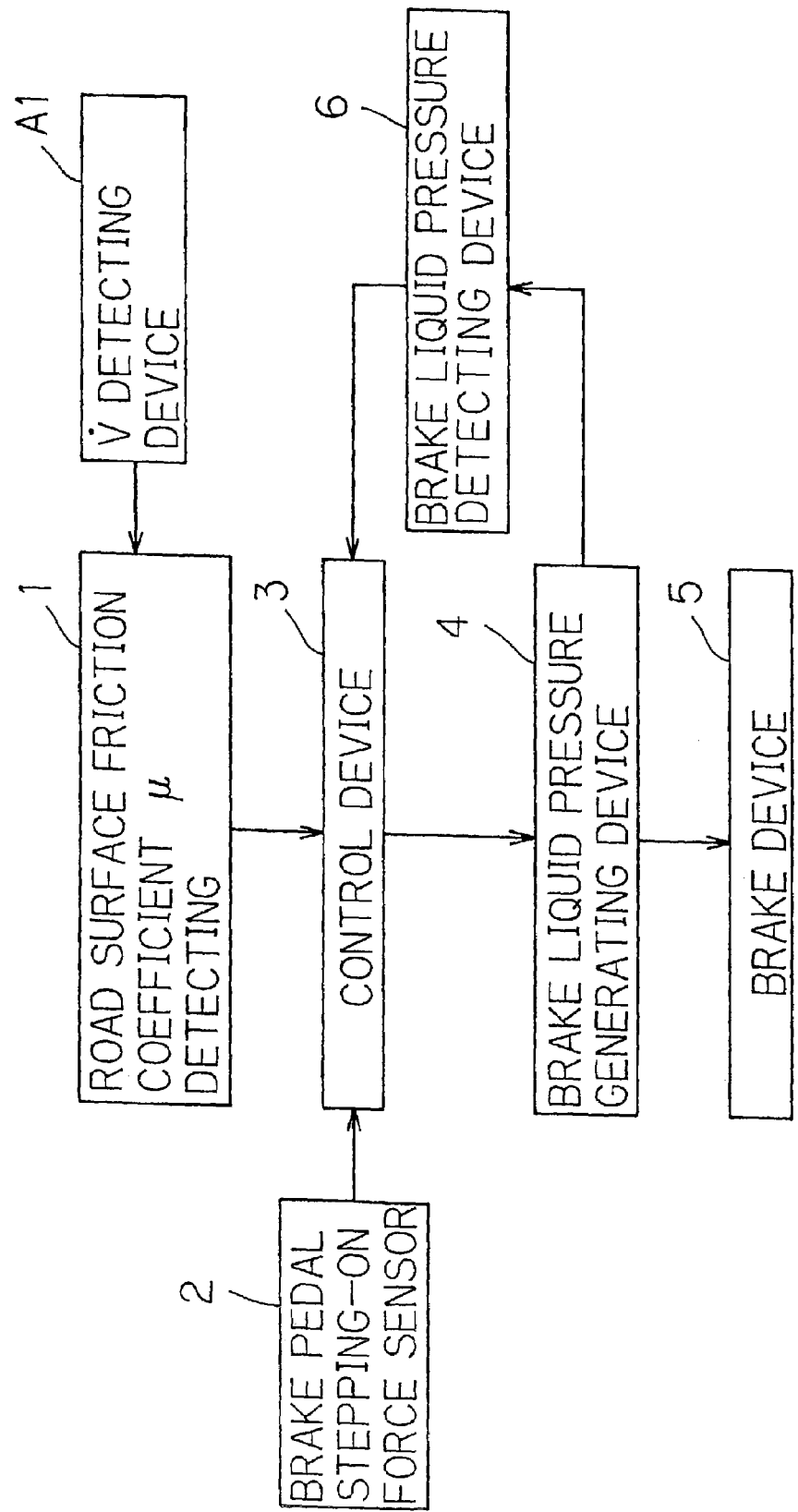
FIG. 2 is a block diagram showing an example of a hard arrangement for a control method for an anti-lock brake system for vehicles according to a third embodiment of the present invention.

FIG. 2 is a block diagram showing an example of a hard arrangement for a control method for an anti-lock brake system for vehicles using the road surface friction coefficient $\mu$ a third embodiment of the present invention described, and this embodiment differs from the preceding one in that instead of the $\omega$, $\dot{\omega}$ detecting device A shown in FIG. 1, use is made of a V detecting device A1 using an acceleration sensor, the rest of the arrangement being the same so that a repetitive description thereof is omitted. In this embodiment, to obtain the optimum control start point, the acceleration sensor is used and as for $\mu$ according to $dV/dt$, from the equation of wheel motion, $$m \cdot dV/dt = -\mu N$$

In the above equation, m is the vehicle weight, N is the wheel load, and $\mu$ is the friction coefficient. However, m can be regarded as a constant.

From the above equation, $$\mu = -m \frac{dV/dt}{N}$$

and the $\mu$ in this equation is used.

And $dV/dt$ is measured by the acceleration sensor and N is measured and calculated by the vertical load sensor mounted on the suspension, and the proper range around this maximum value is taken as the optimum control start point.

Figure 3:
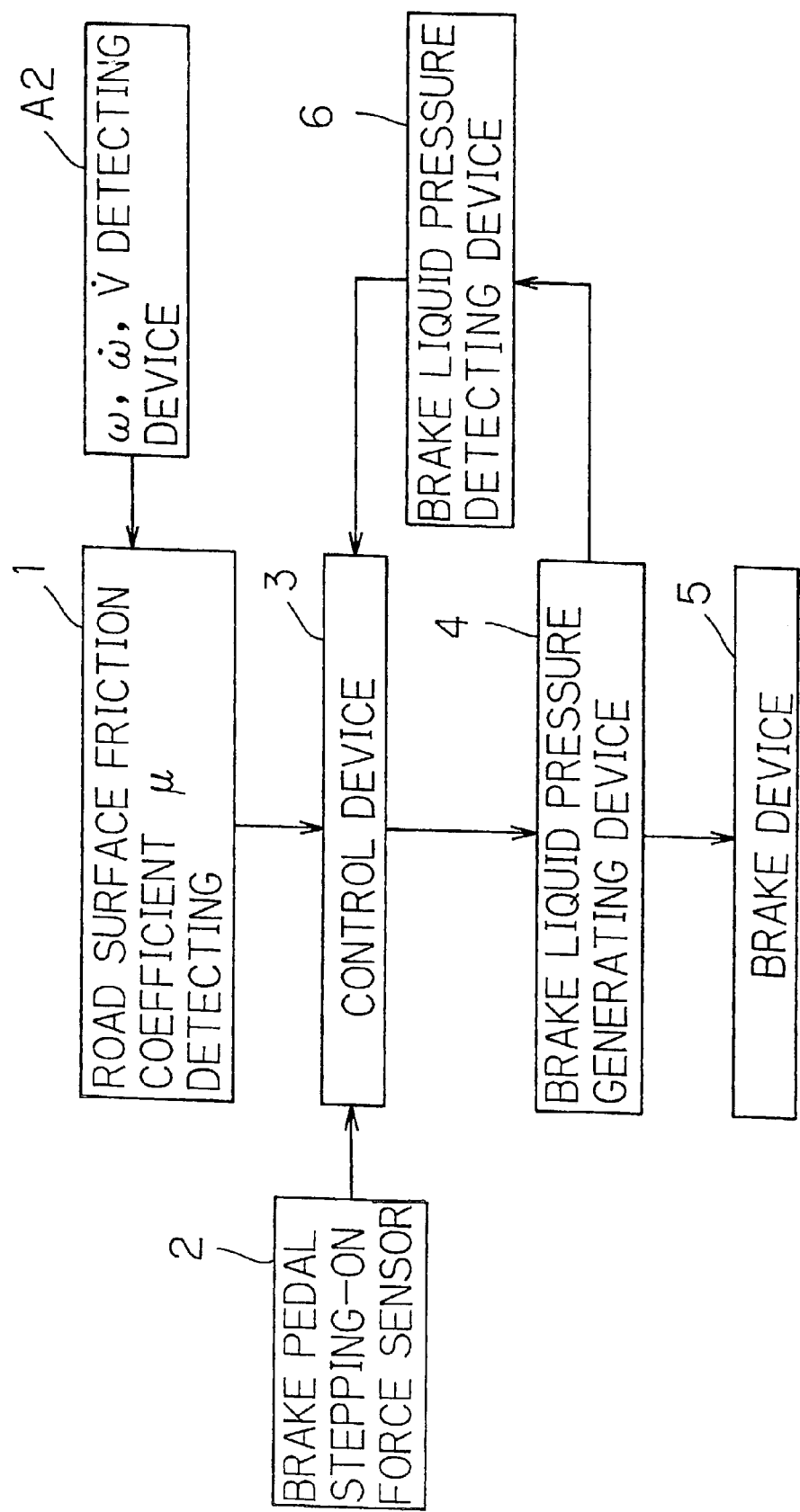
FIG. 3 is a block diagram showing an example of a hard arrangement for a control method for anti-lock brake system for vehicles according to a fourth embodiment of the present invention.

FIG. 3 is a block diagram showing an example of a hard arrangement for a control method for anti-lock brake system for vehicles using the road surface friction coefficient $\mu$ of a fourth embodiment of the present invention, which differs from the embodiments shown in FIGS. 1 and 2 only in that an $\omega$, $\dot{\omega}$, $\dot{v}$ detecting device A2 is used, the rest of the arrangement being the same so that a repetitive description thereof is omitted.

Figure 4:
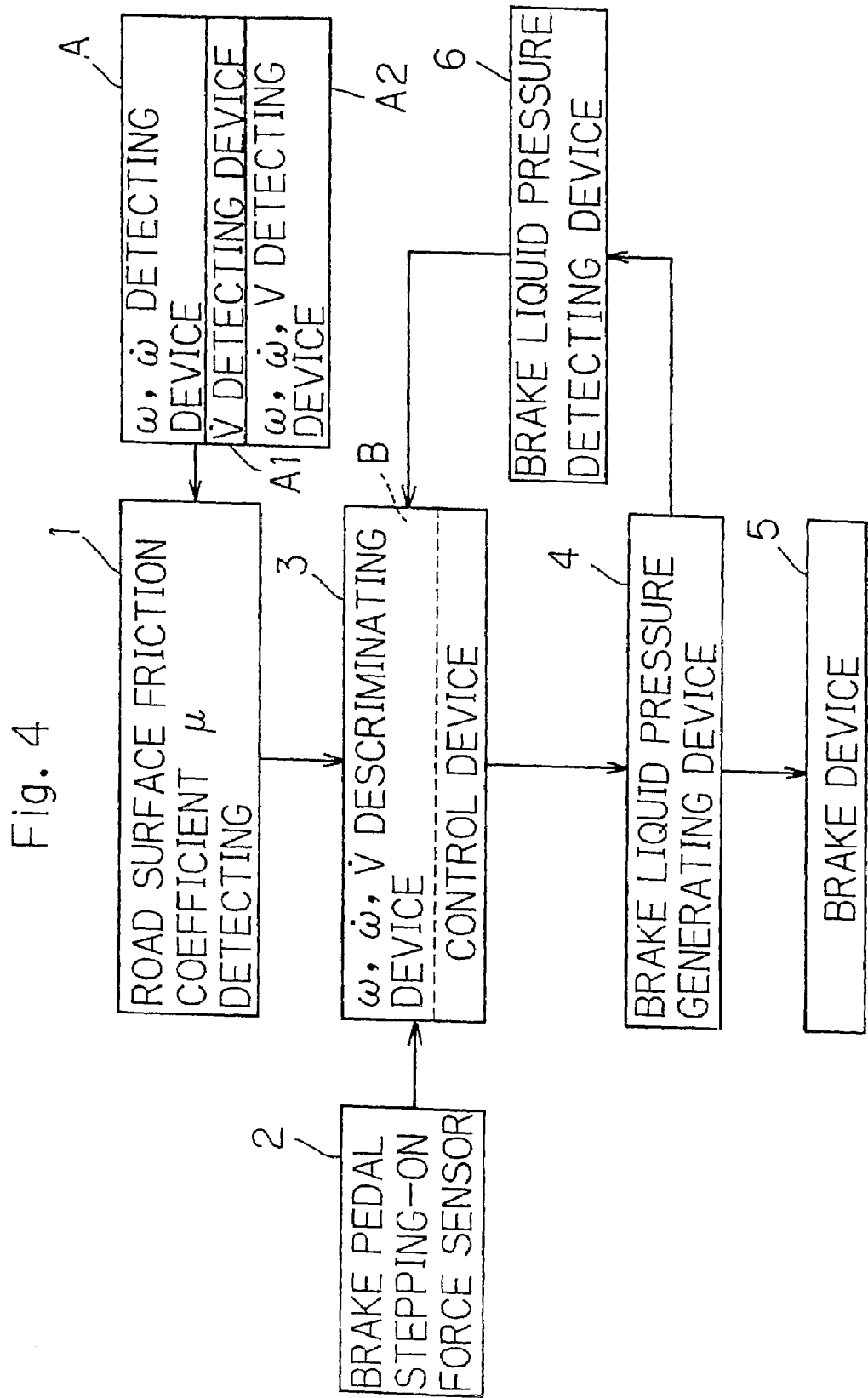
FIG. 4 is a block diagram showing an example of a hard arrangement for a control method for an anti-lock brake system for vehicles according to fifth and sixth embodiments of the present invention.

FIG. 4 is a block diagram showing an example of a hard arrangement for a control method for an anti-lock brake system for vehicles using the road surface friction coefficient $\mu$ according to the fifth and sixth embodiments of the present invention, and this embodiment differs from the embodiments shown in FIGS. 1 through 3 in that detecting devices A, A1, A2 for $\omega$, $\dot{\omega}$, $\dot{v}$ are selectively used and in that a discriminating circuit B based on $\omega$, $\dot{\omega}$, $\dot{v}$ is added to the control device 3, the rest of the arrangement being the same so that a repetitive description thereof is omitted.

The operation of the control device 3 in the embodiment shown in FIG. 4 will now be described on the basis of the flowcharts shown in FIGS. 5 through 8.

Figure 5:
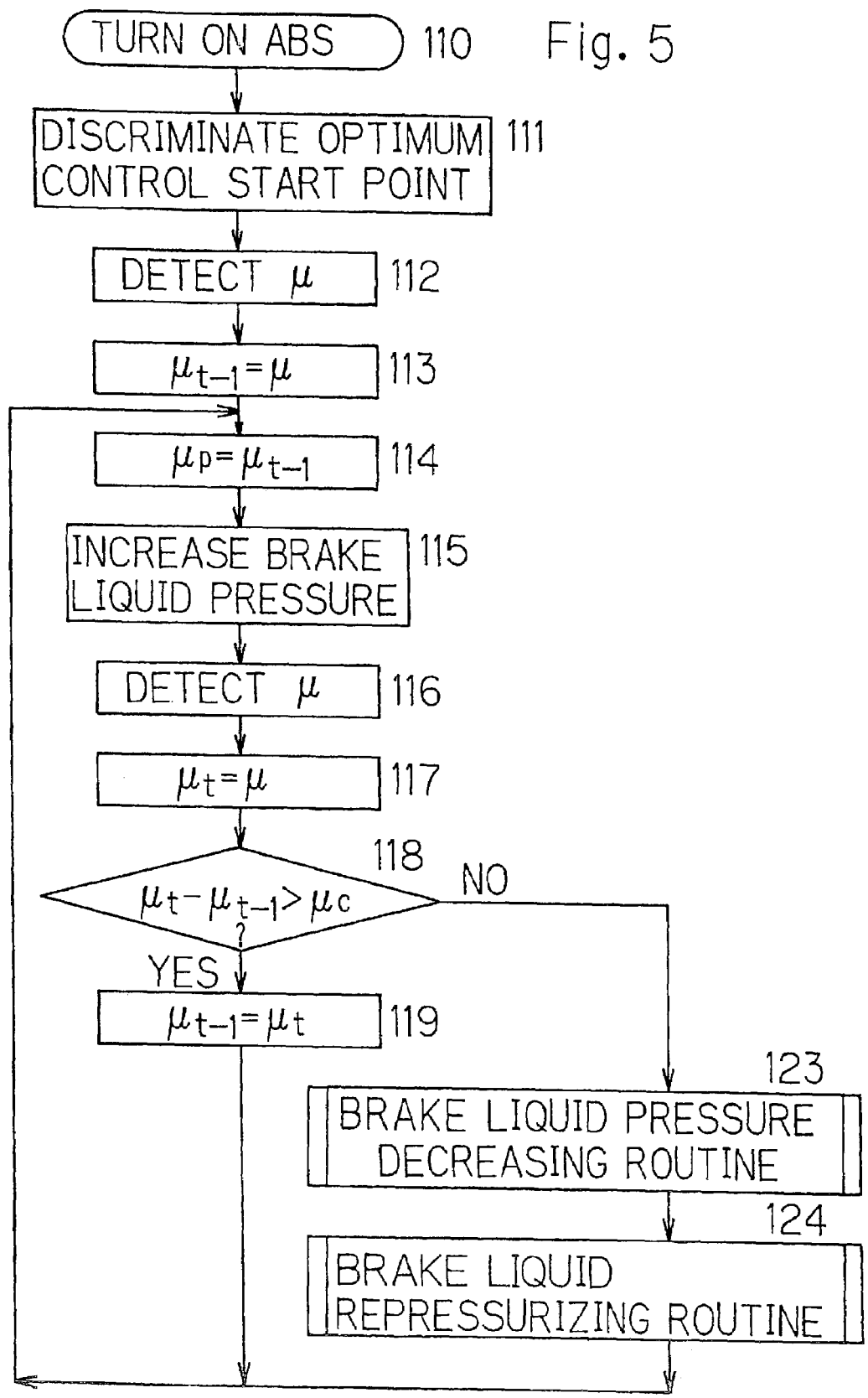
FIG. 5 is a flowchart showing a main routine processing of a control device shown in FIG. 4.

When the brake stepping-on force exceeds the preset value, the anti-lock brake device starts to operate, changing the normal brake operation to the anti-lock brake operation. The step 110 of the main routine shown in FIG. 5 represents the start of this anti-lock brake operation. Subsequently, at the step 111, the optimum control start point is discriminated on the basis of $\omega$ and $\dot{\omega}$ or $\dot{v}$, at the step 112, the road surface friction coefficient $\mu$ is detected, and at the step 113, this value of $\mu$ is stored in a variable labeled by $\mu$ t−1. Subsequently, at the step 114, this value is stored in a variable labeled by this $\mu p$. Then, after the brake liquid pressure is increased at the step 115, $\mu$ is detected at the step 116. At the step 117, the detected value of $\mu$ of the step 116 is stored in a variable labeled by $\mu t$. Then the processing goes to the step 118, comparing the difference $\mu t - \mu t -1$ between two values $\mu t$ and $\mu t -1$ with a predetermined reference value $\mu c$. If the difference $\mu t - \mu t -1$ is greater than $\mu c$, the processing goes to the step 119, and if it is equal to or smaller than $\mu c$, the processing goes to the brake liquid pressure decreasing routine at the step 123. At the step 119, the value stored in the variable $\mu t$ is stored in the variable $\mu t -1$ and this value of $\mu t -1$ is updated. subsequently the processing returns to the step 114.

Figure 6:
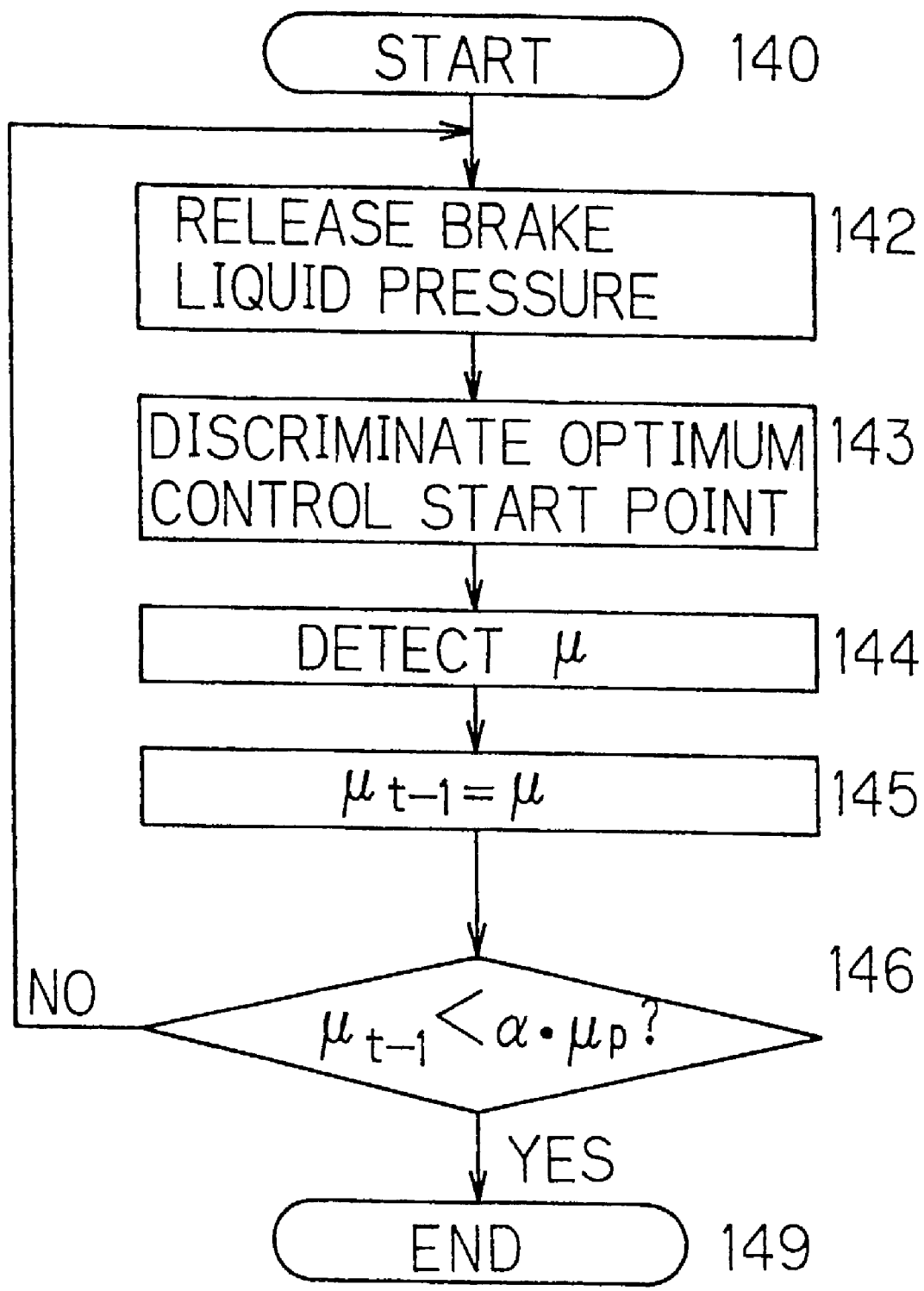
FIG. 6 is a flowchart showing a brake liquid pressure decrease processing routine shown in FIG. 5.

At the brake liquid pressure decreasing routine 123, as shown in FIG. 6, first at the step 142 the brake liquid pressure is released or decreased to a given lower level. Then at the step 143, the optimum control start point is discriminated on the basis of $\omega$ and $\dot{\omega}$ or $\dot{v}$ and after the $\mu$ is detected at the step 144, this detected value is stored in the variable $\mu t -1$ at the step 145.

Then, the processing goes to the step 146, where it compares $\mu t -1$ with $\alpha \cdot \mu p$. The coefficient $\alpha$ is a constant preset at a suitable constant value in the range of 0 to 1. If the variable $\mu t -1$ is smaller, the processing goes to the step 149, where the brake liquid pressure decreasing routine 123 is completed, and it goes to the brake liquid re-pressurizing routine at the step 124. If the variable $\mu t -1$ is greater, it returns to the step 142.

Figure 7:
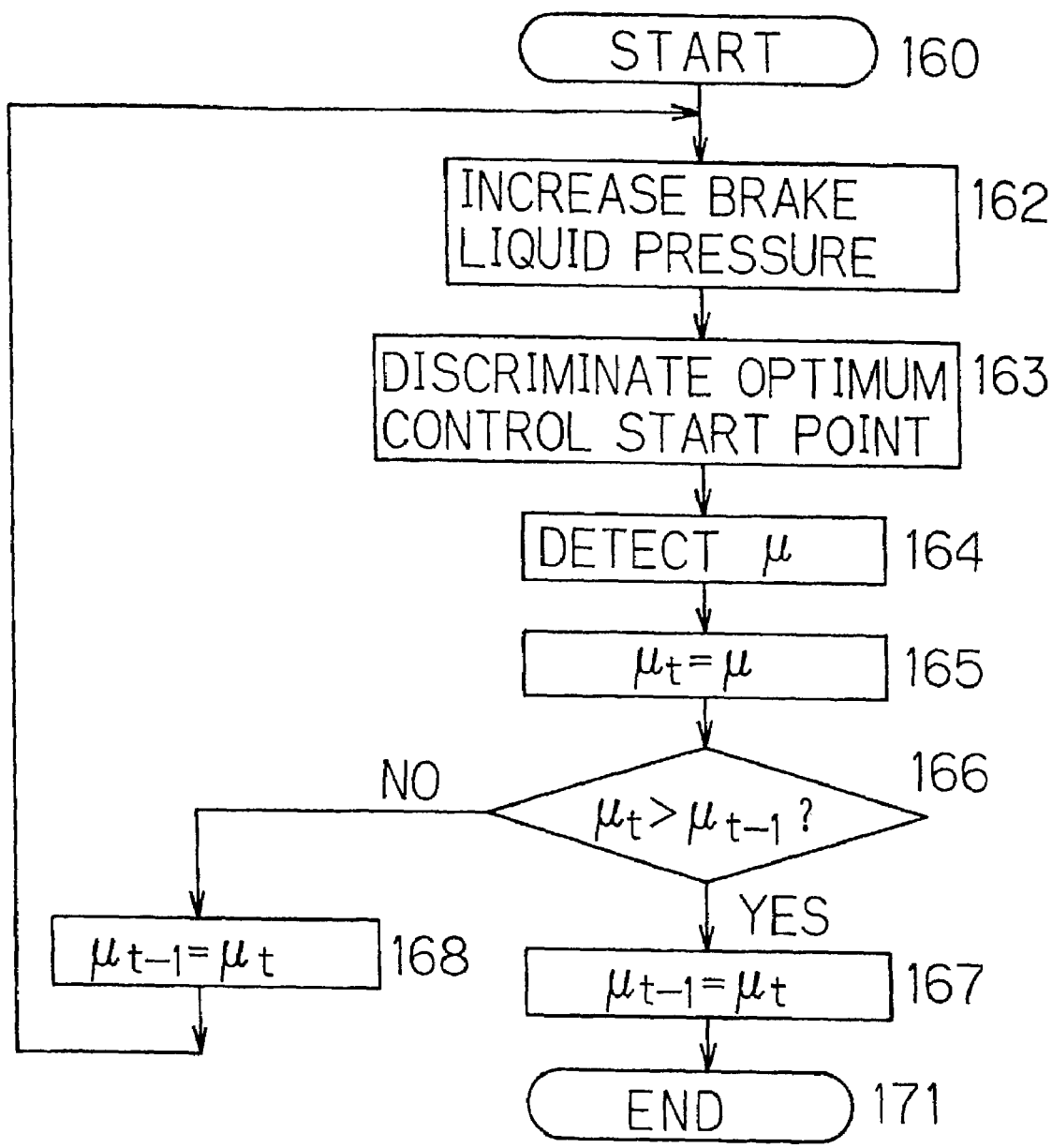
FIG. 7 is a flowchart showing a brake liquid pressure re-increase processing routine shown in FIG. 5.

At the brake liquid re-pressurizing routine subsequent to the brake liquid pressure decreasing routine 123, the processing shown in FIG. 7 is performed. First, at the step 162, the brake liquid pressure is increased. Subsequently, at the step 163, the optimum control start point is discriminated on the basis of $\omega$, $\dot{\omega}$ or $\dot{v}$, and $\mu$ is detected at the step 164 and is stored in the variable $\mu t$ at the step 165. Then, the $\mu t$ is compared with the variable $\mu t -1$ at the step 166. If the variable $\mu t$ is greater, the processing goes to the step 167 where the variable $\mu t$ is stored in the variable $\mu t -1$ to update the stored value of the variable $\mu t -1$. Then, the processing goes to the step 171 to complete the brake liquid re-pressurizing routine, returning to the step 114 of the main routine. If the variable μt is smaller or equal at the step 166, the processing goes to the step 168 to update the variable μt−1 to the variable μt in the same manner as at the step 167. And the processing returns to the step 162.

As the control device 3 performs the above-described processing, the anti-lockbrake system according to the present invention operates as follows. When the anti-lock brake system starts to operate, while the rate of increase of the road surface friction coefficient 11 exceeds a predetermined reference value, the brake liquid pressure is kept on the increase and ω or dω/dt or dV/dt is used to decide the optimum control start point, and when the rate of increase of the road surface friction coefficient μ lowers below the reference value, the brake liquid pressure is lowered or released. At this time, after moving to the pressure decreasing mode, the control is moved from the pressure decreasing mode to the pressure increasing mode by using the threshold value for pressure decrease, the preset value of specified value of elapsed time, or the discriminating circuit or a combination of these factors. Thereafter, the above operation is continued and repeated until the vehicle stops.

Figure 8:
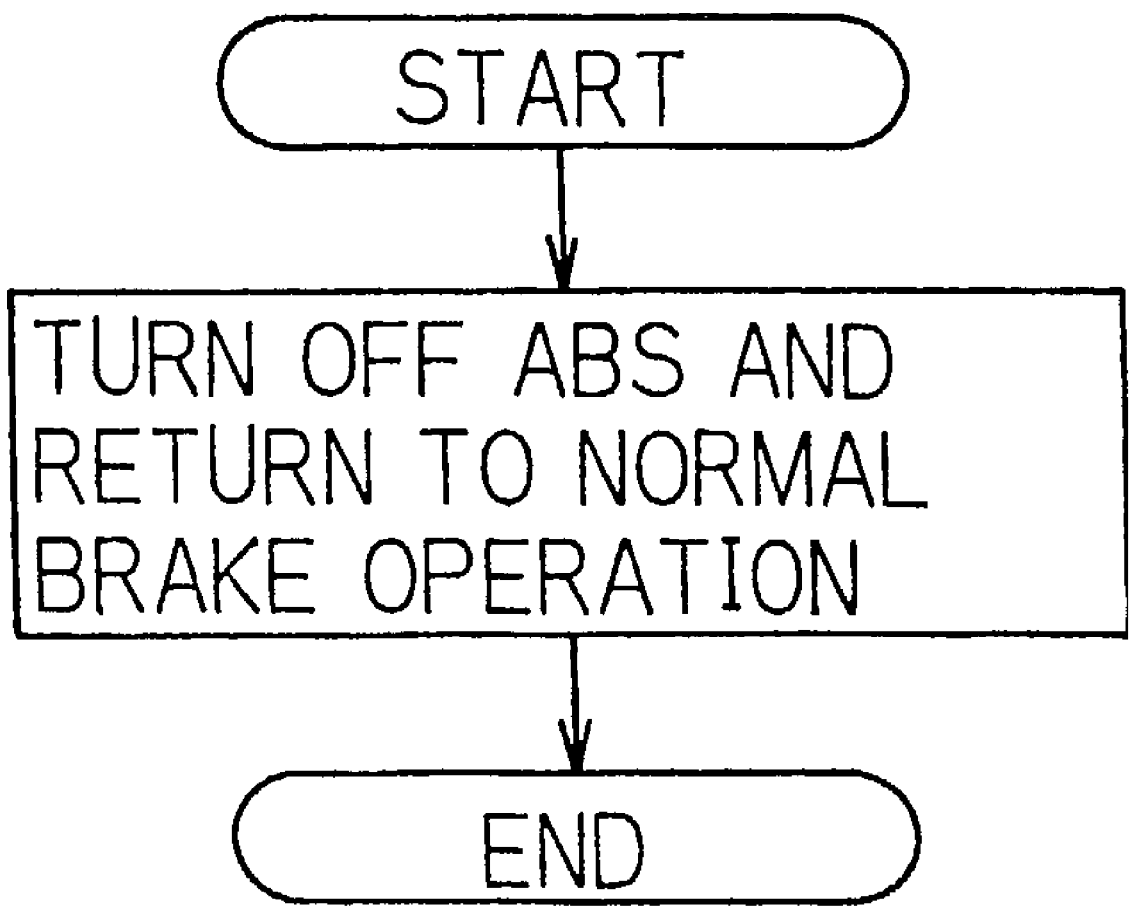
FIG. 8 is a flowchart showing an interruption with respect to the main routine processing shown in FIG. 5.

In the case where the vehicle speed lowers below a given value during the anti-lock brake operation, no matter which step in the flowchart shown in FIGS. 5 through 7 the control device 3 is being performed, it immediately executes the interruption routine shown in FIG. 8 to control the brake liquid pressure device such that it ends the anti-lock brake operation and returns to the normal brake operation. If the vehicle speed is sufficiently low, there is no need for anti-lock brake operation and there is no need for it when the vehicle is stopping.

The above refers to an embodiment wherein the road surface friction coefficient μ is used, but in the case where the road surface friction force F is used, the same operation as in the above operation using μ can be performed by multiplying μ by N from the relation $$F = \mu \cdot N$$

Figure 9:
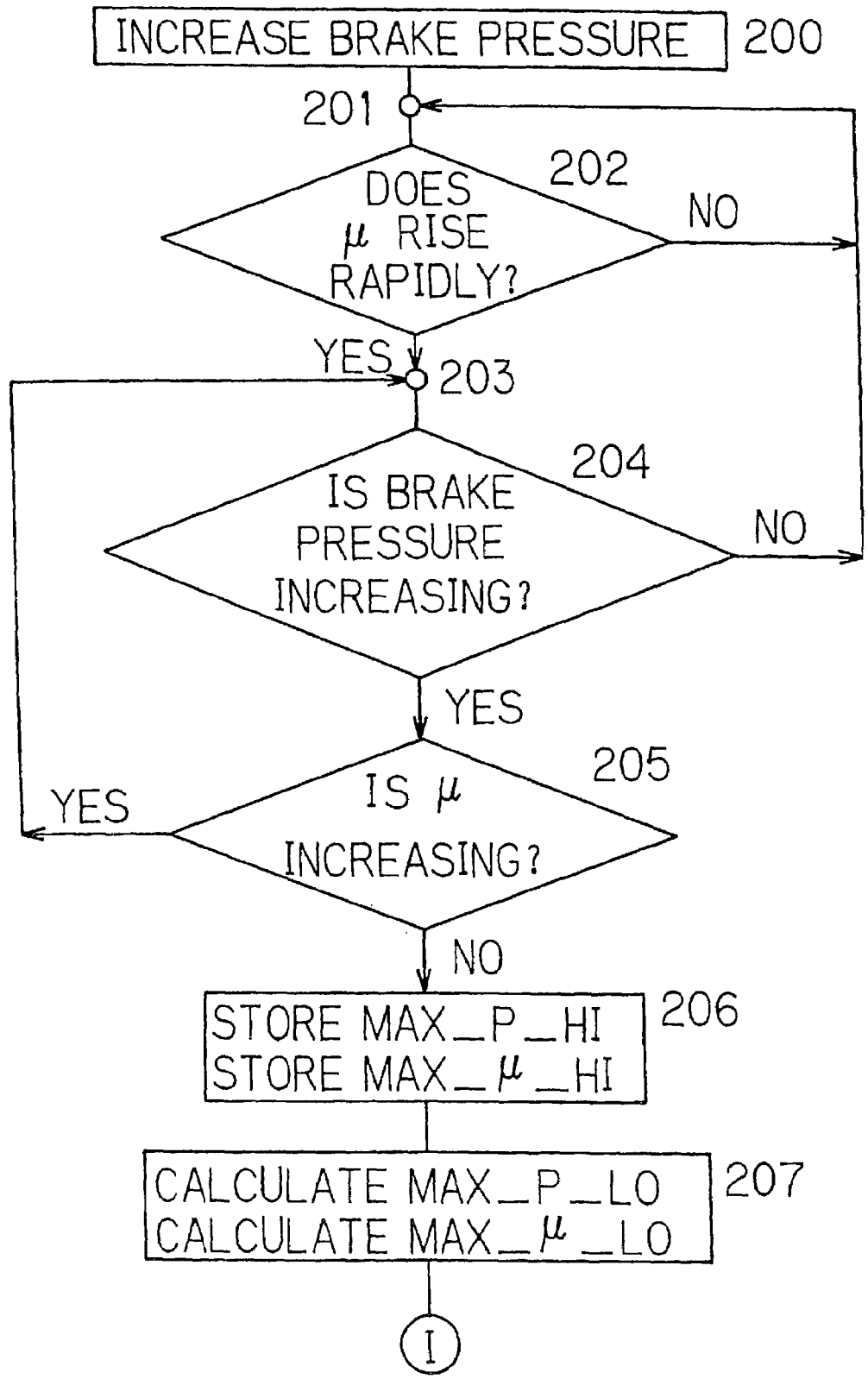
FIG. 9 is a flowchart showing a control method for an anti-lock brake system for vehicles according to a seventh embodiment of the present invention.
Figure 9A:
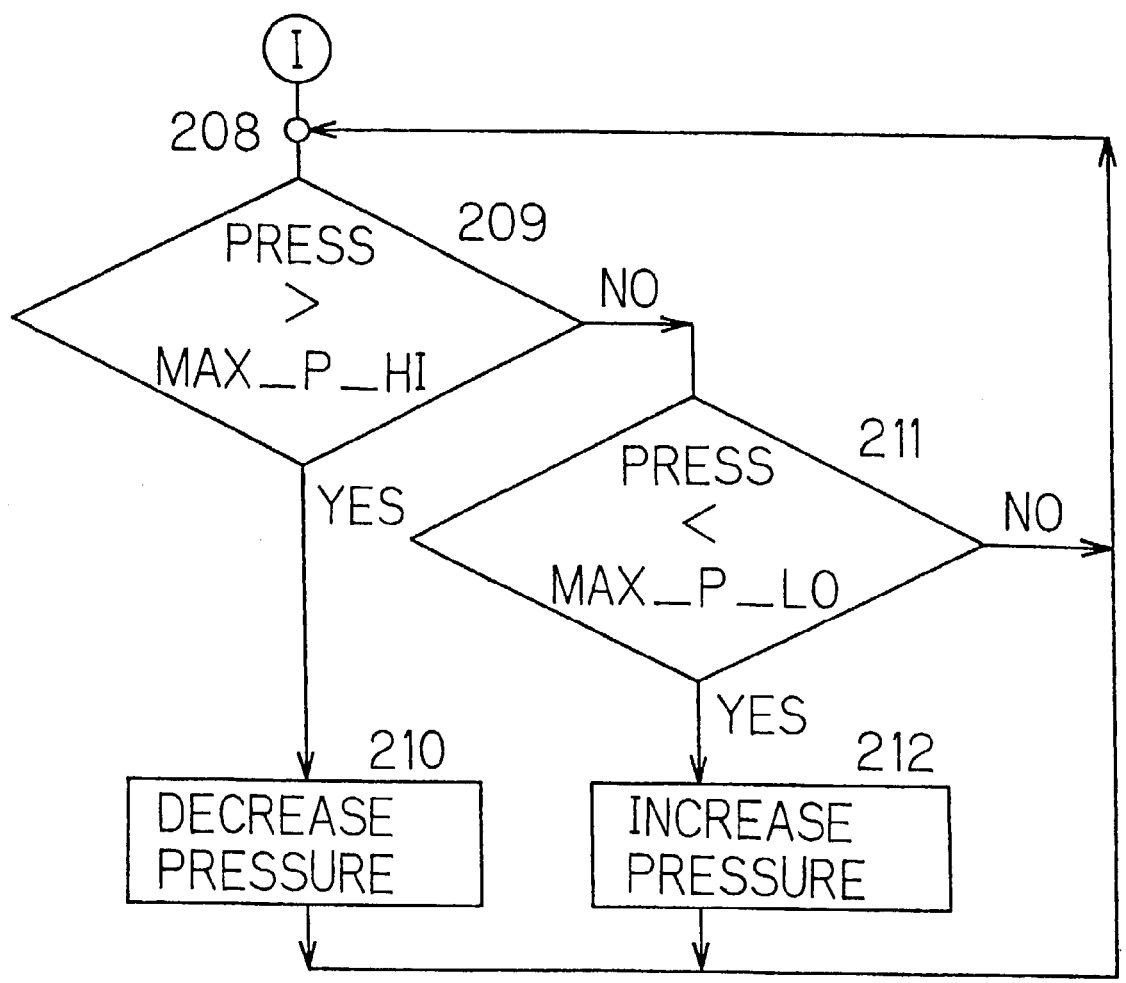

FIG. 9, 9A is a schematic flowchart showing a control method for an anti-lock brake system for vehicles using the road surface friction coefficient μ according to a seventh embodiment in the present invention. If the driver steps on the brake in an emergency, the brake pressure is increased at the step 200. Then, at the step 202, whether or not μ sharply increases is decided. If it sharply increases, it is decided to be a hard brake and the ABS control starting at the step 203 is performed. If μ decreases at the steps 204 and 205 irrespective of the brake pressure being on the increase, it is decided that the μ max value available on these road surface has been passed, and at the step 206, the μ value before μdecreases is stored in MAX_μ_HI and the associated brake pressure is stored in MAX_P_HI. At the step 207, on the basis of this MAX value, the lower limit of vibration range of the usual road surface is calculated as MAX_μ_LO and the corresponding brake pressure is calculated as MAX_P_LO. At the step 209, if the current brake pressure is greater than MAX_P_HI, the decrease of the brake pressure at the step 210 is effected, with the processing returning to the step 208. Further, if the current brake pressure is less than MAX_P_HI, the processing goes to the step 211. At the step 211, if the current brake pressure is less than MAX_P_LO, the brake pressure is increased at the step 212 and the processing returns to the step 208. Further, if, at the step 211, the current brake pressure is greater than MAX_P_LO, the processing returns to the step 208 without doing anything.

Thereby, the brake pressure can be maintained between μMAX and the calculated fixed lower limit by a minimum of control.

Figure 10:
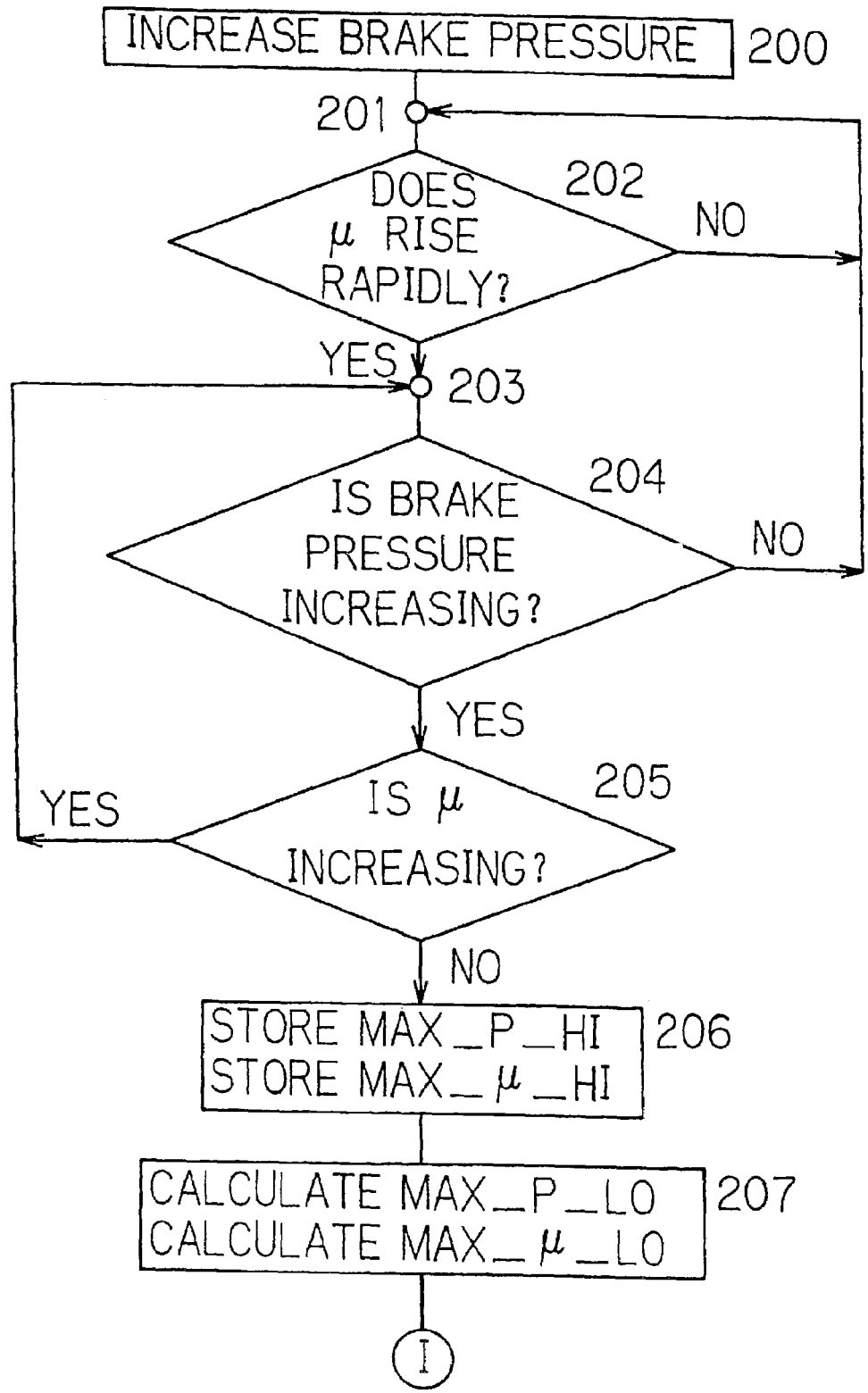
FIG. 10 is a flowchart showing a control method for an anti-lock brake system for vehicles according to an eighth embodiment of the present invention.
Figure 10A:
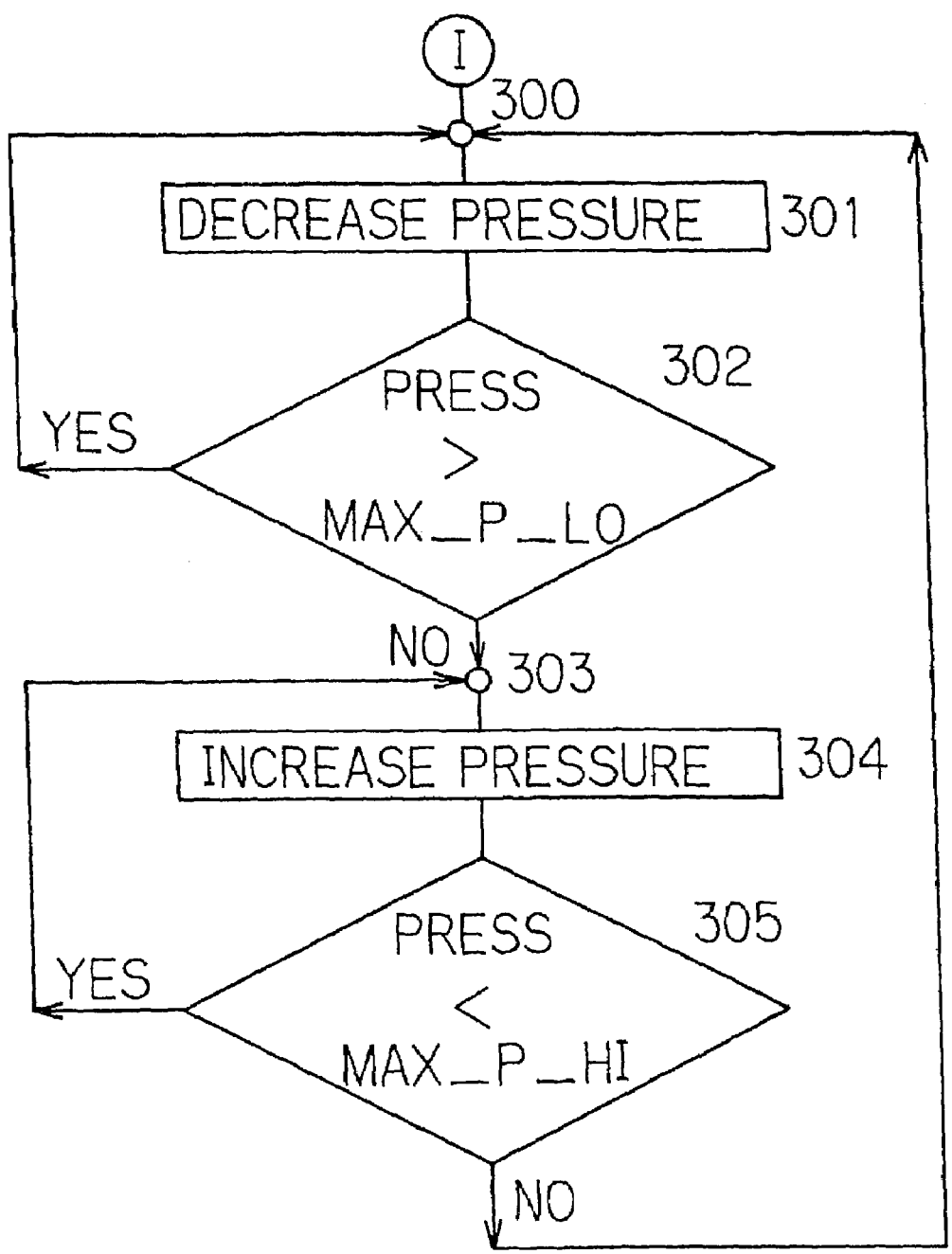

FIG. 10, 10A is a schematic flowchart showing a control method for an anti-lock brake system for vehicles using the road surface friction coefficient μ according to an eighth embodiment of the present invention. The operation from the step 200 the step 207 is exactly the same as the seventh embodiment, so that a description thereof is omitted. In the loop including the steps 300, 301, 302, the pressure is decreased until the brake pressure is equal to MAX_P_LO. Then, in the loop including the steps 303, 304, 305, the pressure is increased until the brake pressure is equal to MAX_P_HI. Then, the processing returns to the loop including the steps 300, 301, 302. Thus, the brake pressure can be varied such that it is between the MAX value and the calculated fixed lower limit.

Figure 11:
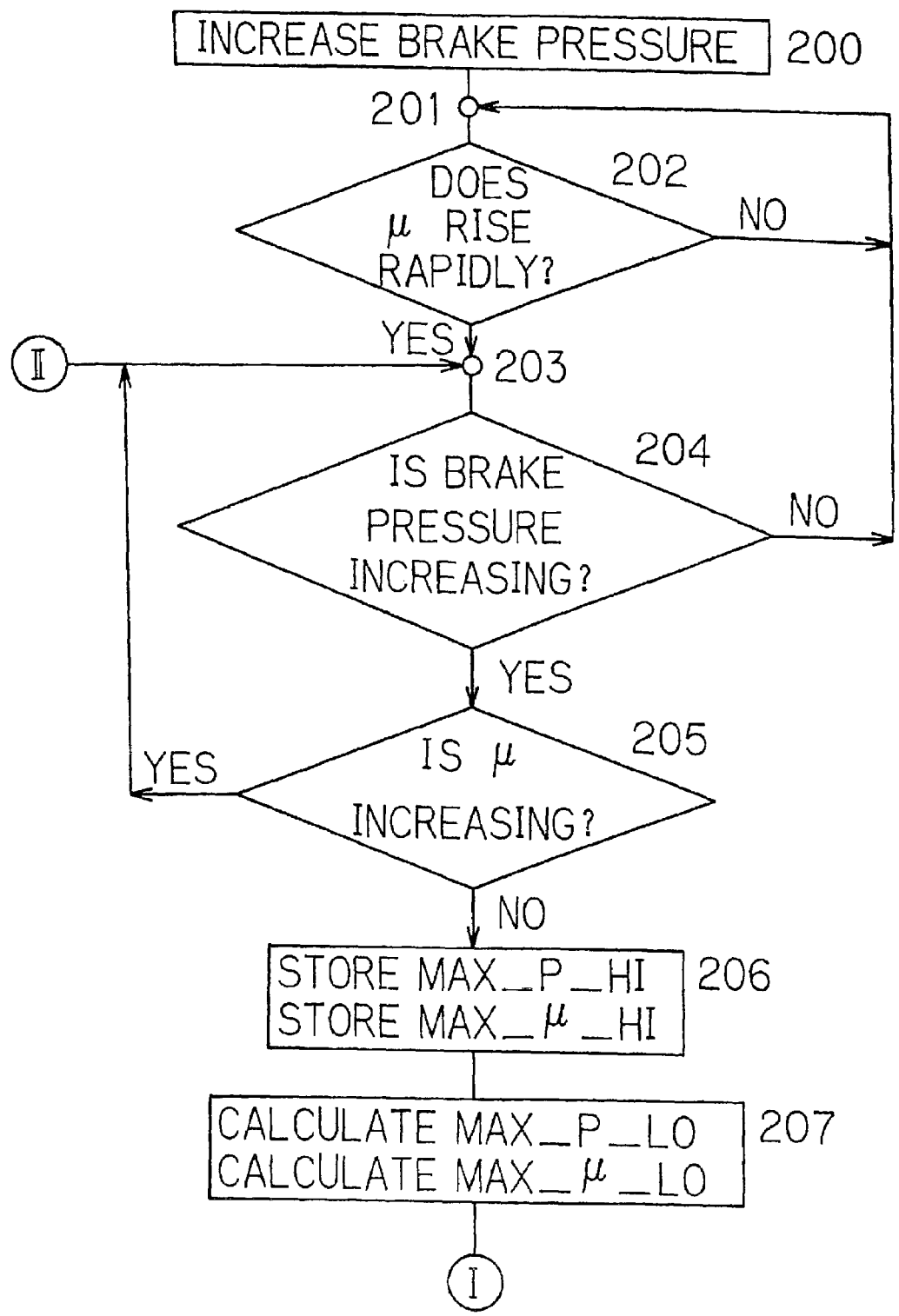
FIG. 11 is a flowchart showing a control method for an anti-lock brake system for vehicles according to a ninth embodiment of the present invention.
Figure 11A:
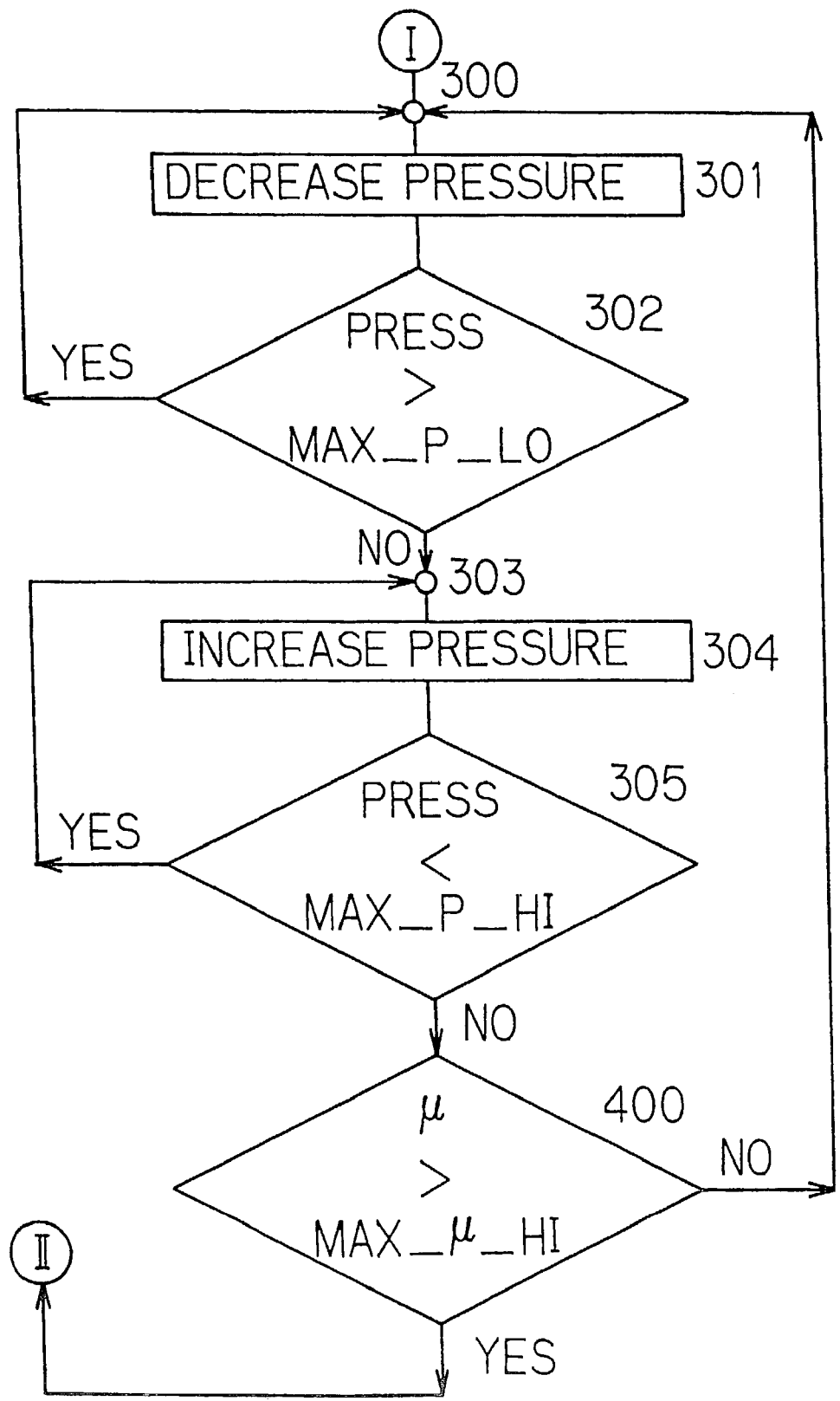

FIG. 11, 11A is a schematic flowchart showing a control method for an anti-lock brake system for vehicles using the road surface friction coefficient μ according to a ninth embodiment of the present invention. The operation from the step 200 to the step 305 is exactly the same as in the eighth embodiment, so that a description thereof is omitted. When the processing has gone through the loop including the steps 303, 304, 305, that is, if at the step 400 the current μ value is greater than MAX_μ_HI stored at the step 206, it can be decided that the vehicle has moved to a road surface where greater μ can be obtained. The processing returns to the step 203 where the ABS control was started, and it is possible to seek the μMAX value available from this road surface.

Figure 12:
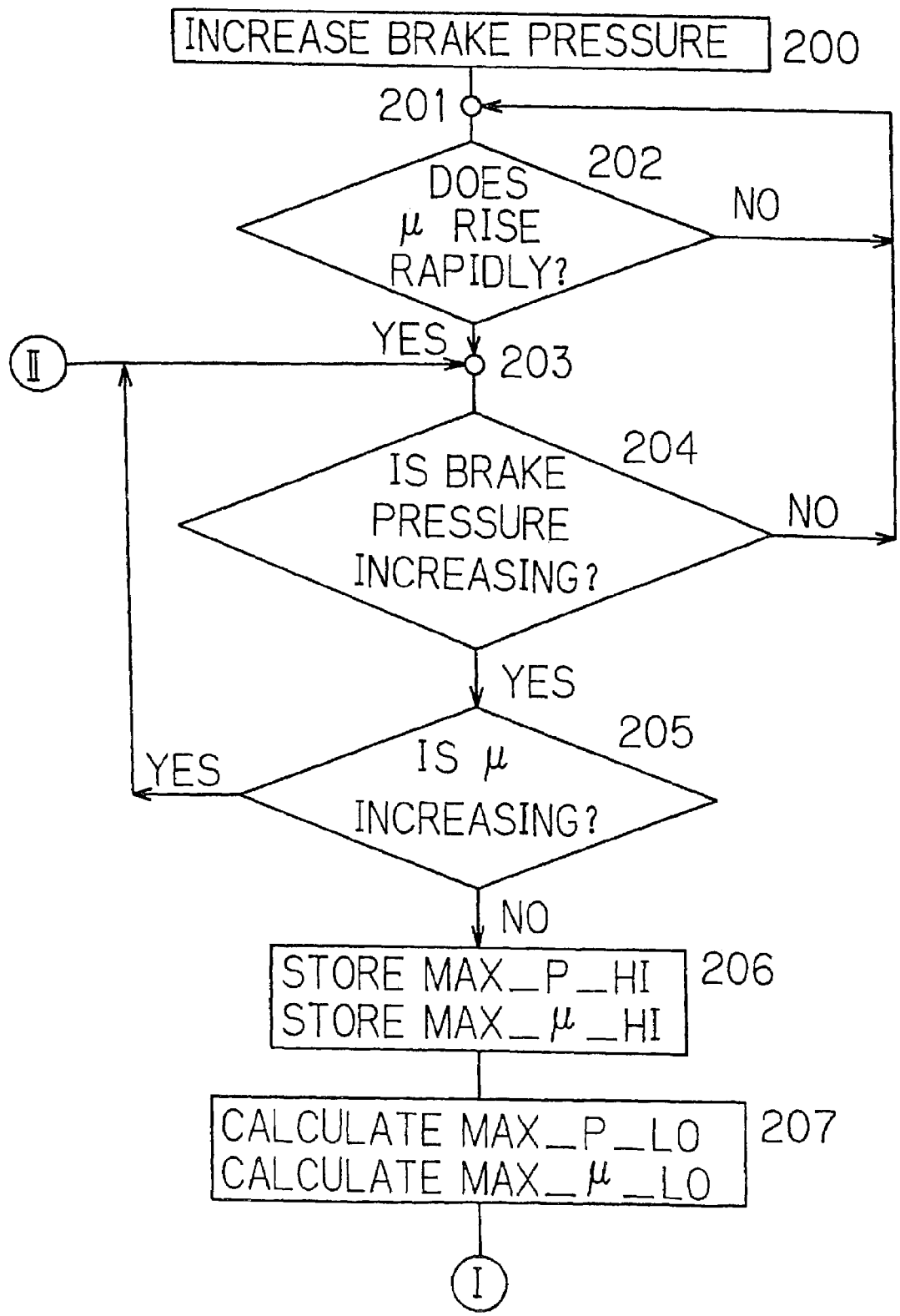
FIG. 12 is a flowchart showing a control method for an anti-lock brake system for vehicles according to a tenth embodiment of the present invention.
Figure 12A:
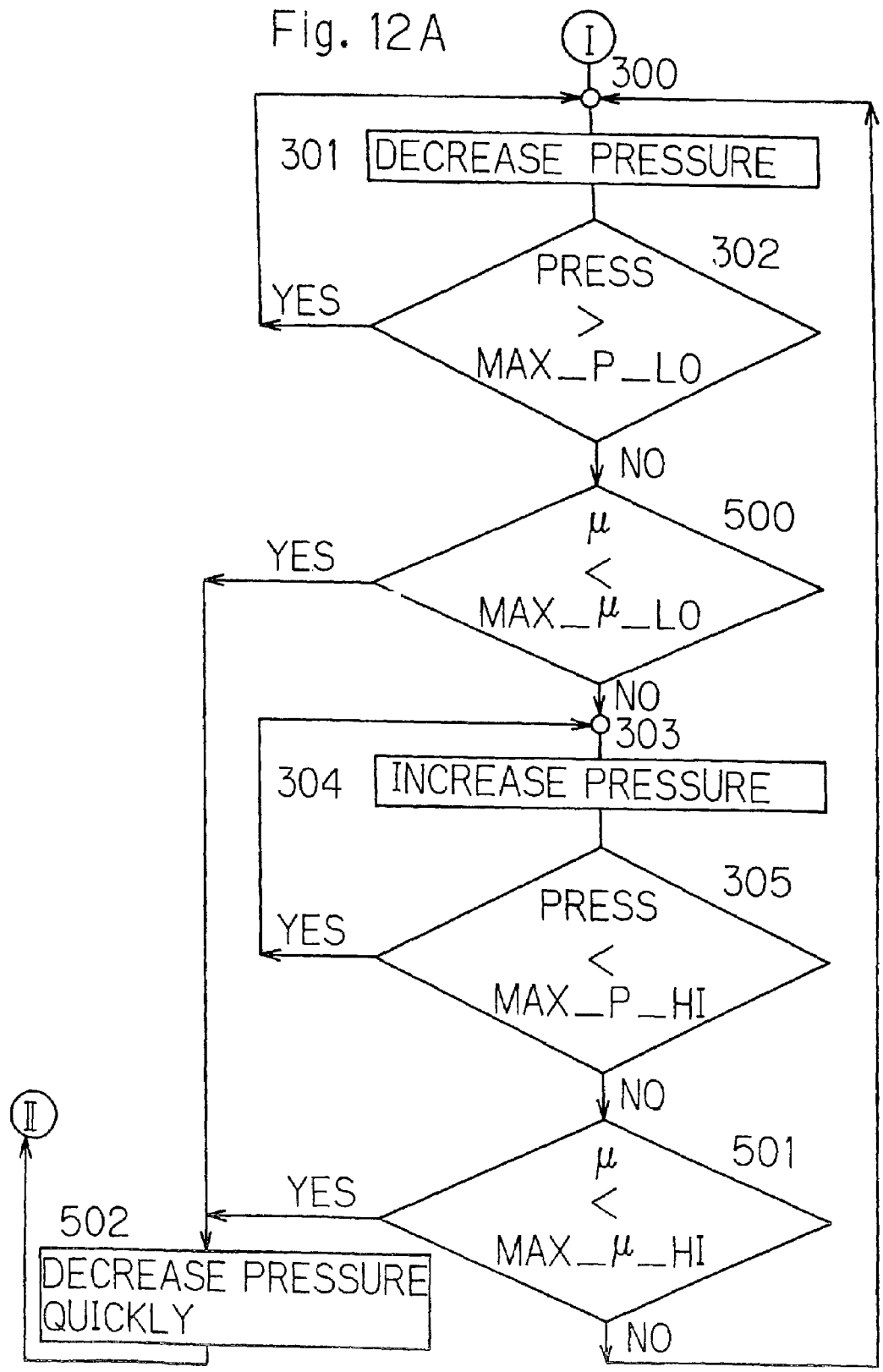

FIG. 12, 12A is a schematic flowchart showing a control method for an anti-lock brake system for vehicles using the road surface friction coefficient μ according to a tenth embodiment of the present invention. The operation from the step 200 to the step 302 and from the step 303 to the step 305 is exactly the same as in the eighth embodiment, so that a description thereof is omitted. At the time of the step 500, the brake pressure is at the value of MAX_P_LO, and at the time of the step 207, the corresponding μ was MAX_μ_LO. If the current μis smaller than the value of MAX_μ_LO, it is decided that the μ of the road surface has decreased, and after quick decrease of pressure at the step 502, the processing returns to the ABS control start point at the step 203. At the time of the step 501, the brake pressure is at the value of MAX_P_HI, and the corresponding μ at the time of the step 207 was at the value of MAX_μ_HI. If the current μ is smaller than the value of MAX_μ_HI, it is decided that the μ of the road surface has decreased, and after quick decrease of pressure, the processing returns to the ABS control start point at the step 502.

Figure 13:
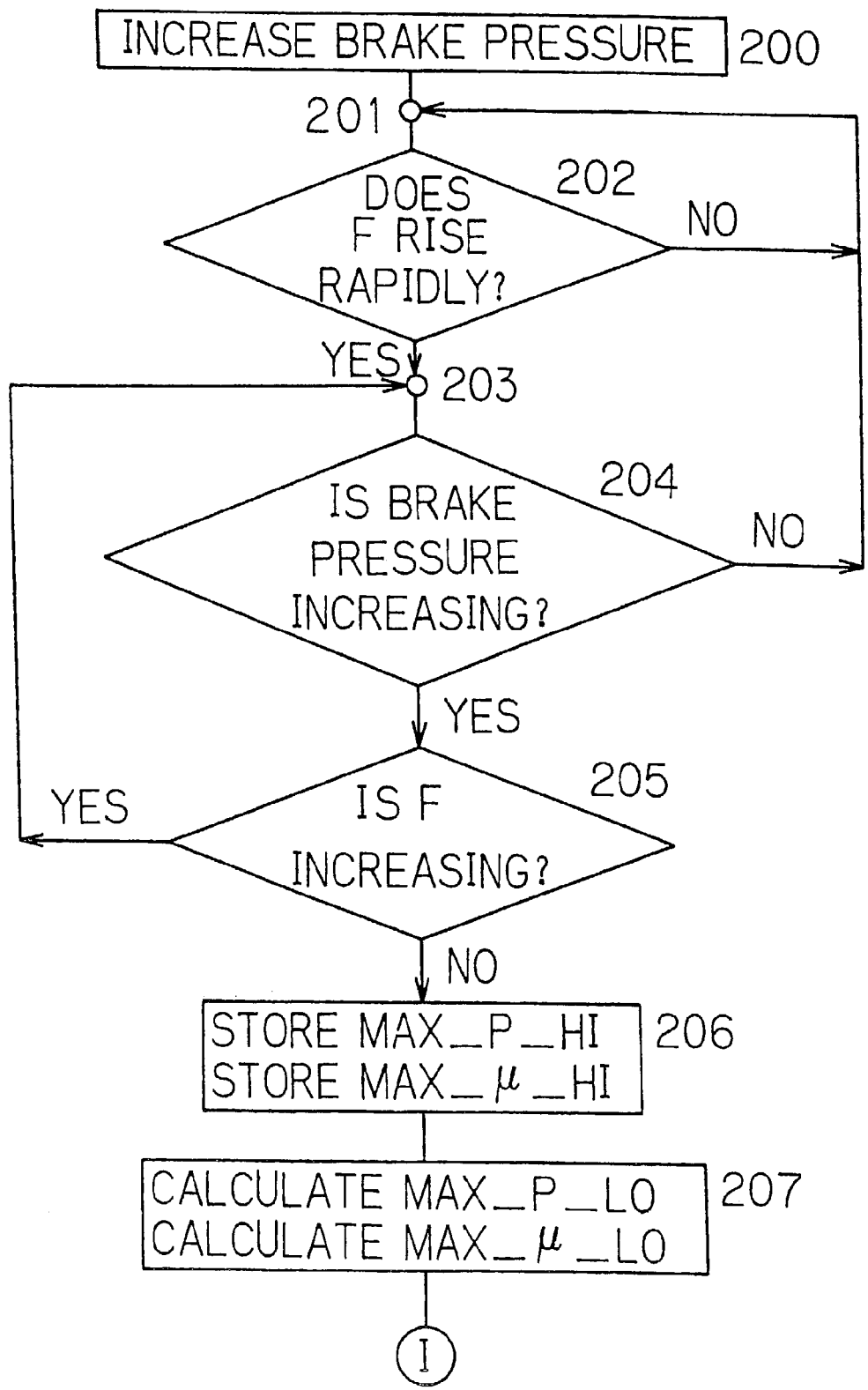
FIG. 13 is a flowchart showing a control method on the basis of the road surface friction force F according to the seventh embodiment of the present invention.
Figure 13A:
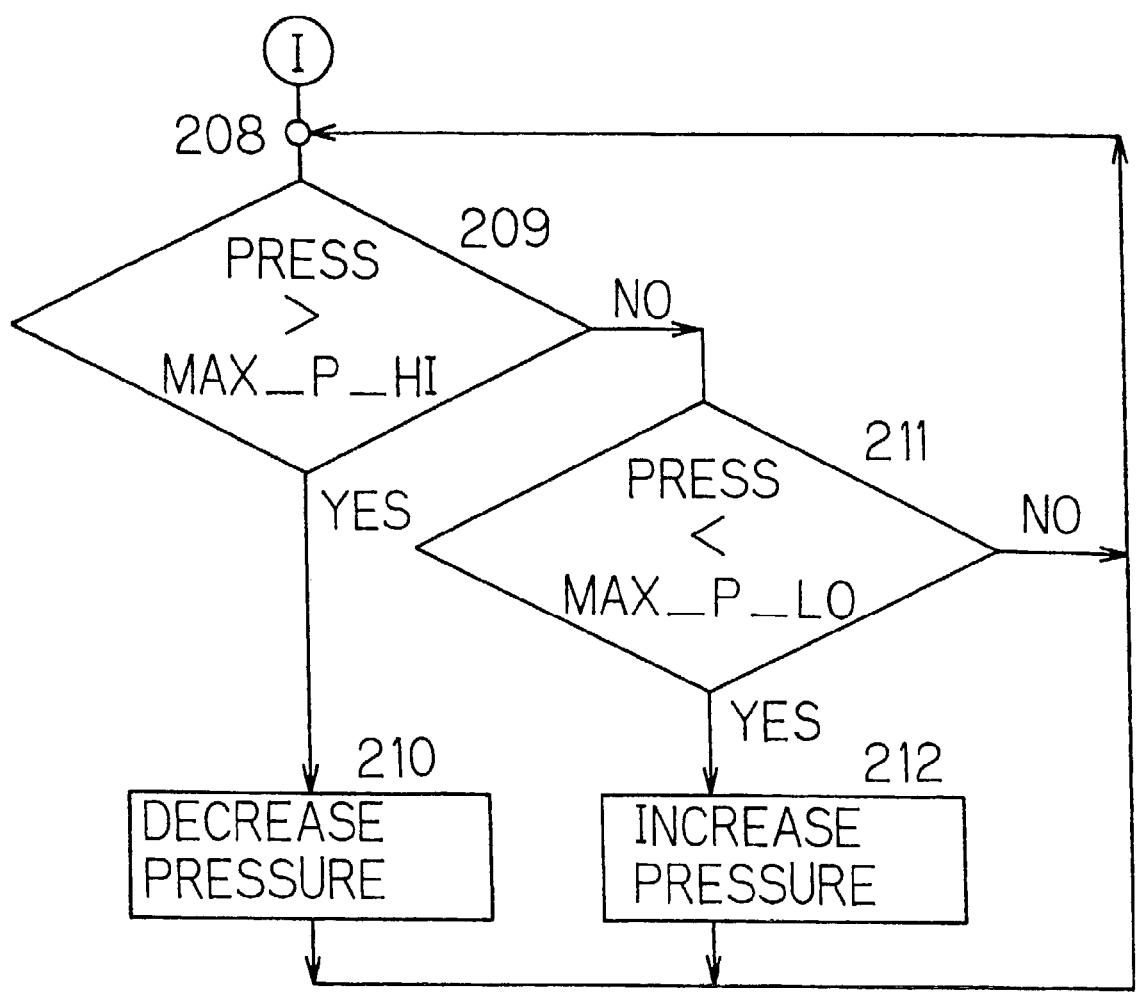

FIG. 13, 13A is a schematic flowchart showing a control method for an anti-lock brake system for vehicles using the road surface friction force F according to a seventh embodiment of the present invention, it being noted that the road surface friction coefficient μ has been replaced by the road surface friction force F. Since the method of control can be performed in exactly the same way as in the case of μ, a detailed description thereof is omitted.

Further, the control using μ shown in FIGS. 10 through 12 can be replaced by the control using F as in the case of FIG. 13.

Method of Detecting Control Point in ABS

Figure 14:
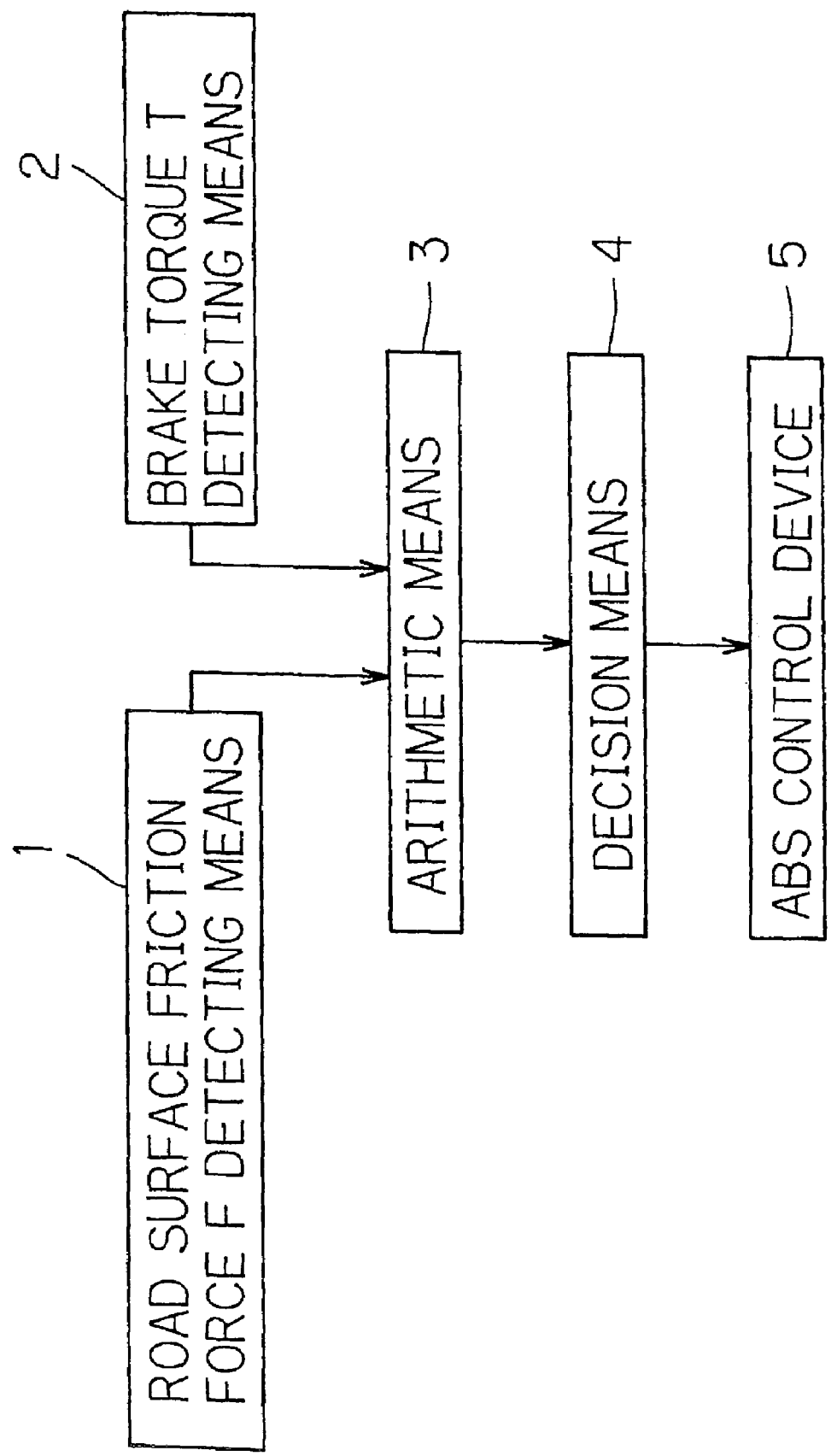
FIG. 14 is a functional system diagram in the present invention.
Figure 15:
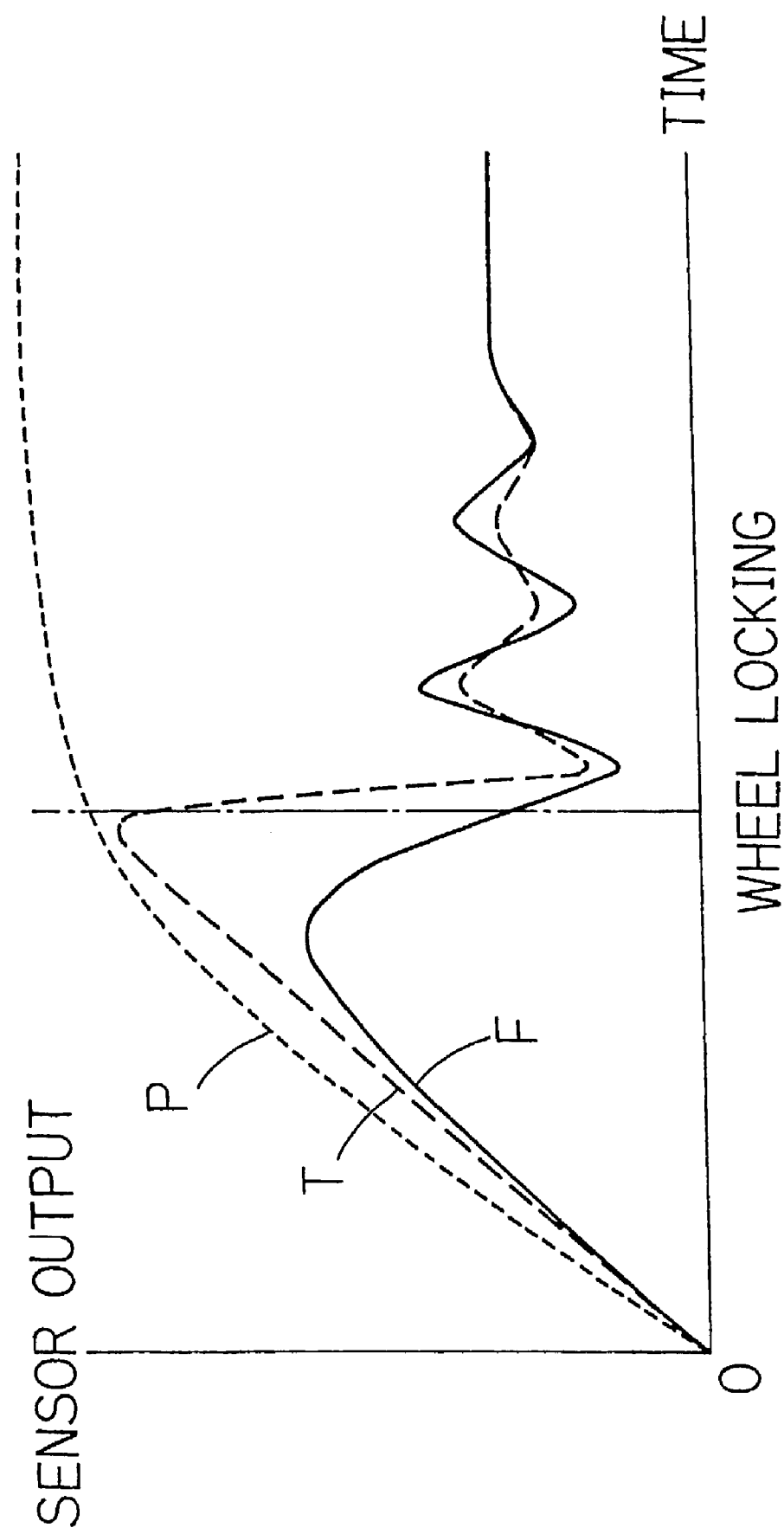
FIG. 15 is an output trend graph of road surface friction force, brake torque and brake oil pressure during hard braking.

The invention will now be described with reference to embodiments shown in the drawings. FIG. 14 is a functional system diagram and FIG. 15 is a typical stress sensor versus output graph obtained when a vehicle is braked hard leading to the locking of the wheel. As can be seen from FIG. 15, when a vehicle is braked hard, for some time (after brake on) with sufficient friction force remaining on the road surface, as the curve P (brake oil pressure P) rises, the curve F (road surface friction force F) and curve T (brake torque T) increase at the same rate of increase in proportion to the curve P. It is known that the proportion value (F/T) in the output values of the curves F and T in this period of time is constant. However, when the friction force (dependent on the tire and road conditions) obtained from the road surface approaches the limit, the brake torque represented by the curve T continues rising as usual in proportion to the brake oil pressure, but it is known that the rate of increase of the road surface friction force represented by the curve F decreases and then rapidly decreases as soon as the brake oil pressure exceeds a given pressure (the brake force corresponding to the limit value of friction force obtained from the road surface). Therefore, in this period of time, the proportion value (F/T) in the output values of the curves F and T rapidly decreases.

Further, it sometimes happens that the value of the brake torque T is much greater than the road surface friction force F and with the road surface friction force detecting means 1 of FIG. 14 it would be very difficult to detect the pure road surface friction force F. Therefore, usually it follows that with the road surface friction force detecting means 1, a substantial amount of brake torque T mixes in and is measured as crosstalk. If, however, the proportion value (F/T) is used for decision in control rather than using the detected value of the road surface friction force F, then $$\frac{(F+t)}{T} = \frac{F}{T} + \frac{t}{T}$$

where t is the crosstalk component which has mixed in the road surface friction force F. Further, since t is a value proportional to the brake torque T, t/T is a constant. Therefore, in the case where F/T is used to detect the change therein so as to decide the control point, it is possible to effect control of the type in which crosstalk component due to the brake torque T is eliminated.

Thus, as shown in FIG. 14, immediately after braking, the detected value from the road surface friction force detecting device 1 and the detected value from the brake torque detecting means 2 are fed to the arithmetic means 3, where the F/T is successively calculated and the result is fed to the decision means 4. In the decision means 4, the ratio F/T is monitored immediately after the braking and at the point of time when this ratio has suddenly decreased (the change has increased), it is decided that the wheel is going to be locked. And this point in time is detected as the point in time for the first pressure decreasing timing in ABS control and the detected signal is used to give a brake oil pressure decreasing instruction to the ABS control device 5; in this manner, the ABS control to avoid the locking of the wheel is made possible.

If the brake oil pressure P is increased (the oil is pressurized), the brake torque T increases through the transmission delay in the brake system, and through the transmission delay the road surface friction force F increases. Generally, the region on the left-hand side of the peak of the curve F in FIG. 15 is called the stable region, while the region on the right-hand side of the peak of the curve F in FIG. 15 is called the unstable region. If the balance is maintained in the stable region, even if the road surface friction force F changes owing to sending small stones flying, a force acts by which the original position can be instantly restored. However, if the change in the road surface friction force F takes place in the unstable region, it rapidly moves in the wheel locking direction (to the right-hand side of the peak of the curve F) or to the position in the stable region where balance can be maintained.

Therefore, in a fifteenth embodiment the ratio F/T being constant (the first differential of F/T being 0) means stability in the particular position (to the left-hand side of the peak of the curve F) in the graph of FIG. 15, which means that the brake oil pressure P and the brake torque T are balanced with each other. The ratio F/T being constant (the first differential of F/T being 0) means that for example, the brake oil pressure decreasing control when the brake oil pressure P is excessively increased and moves to the unstable region moves it to the stable region to provide the road surface friction force F which is proportional to the current brake oil pressure P. This serves as a confirmation decision allowing the next control to be performed upon completion of the preceding control.

The time when the brake oil pressure P is being decreased is the time when it goes too far in the direction of instability to result in the F/T value being high, and the decision of stopping decreasing the brake oil pressure can better be performed by referring to the preceding or first successful control. In the case of referring to the preceding control, if the brake oil pressure P or the brake torque T which is proportional to P before the locking of the wheel is used to decide the pressure decrease stopping point, the optimum control oil pressure P may change to result in erroneous control if there is a change of the road surface between the preceding time of control and this time of control (for example, from a dry asphalt pavement to a road wet with water). However, if the F/T value is used for making the decision, since the F/T value does not almost change, the decision using the comparison with the preceding value as described in relation to the sixteenth embodiment at the completion of brake pressure decreasing control or the comparison with the first control value at completion of brake pressure decrease control as in the seventeenth embodiment results in a less erroneous decision and hence safer control decision; thus, such means is very effective.

As for the decision of stopping decrease of the brake oil pressure, if the delay in the control system is greater than the response required by the control, fruitless pressure decrease would be performed worsening the braking distance unless the control is effected before the F/T value fully decreases to the target value. This time also, as in the above, the road surface friction force F is directly used; and in order not to result in erroneous control owing to a change of the road surface, decision is made by at the point where the F/T value starts to move in the target direction (the point where it starts to decrease) by using the F/T value as described in the eighteenth embodiment; in this manner, safer control can be effected.

In the case where the F/T value increases during the retaining of the brake oil pressure P or during pressure control, this means that the pressure is moving in the wheel locking direction (to the right in the graph of FIG. 15); therefore, the control is moved to decrease the brake oil pressure P. This is not almost influenced by a change of the road surface since when the F/T value rises above that obtained during the first brake pressure decreasing control initiation of brake pressure decrease control begins in accordance with a nineteenth embodiment. Thus, erroneous control can be effectively eliminated.

In the brake oil pressure retaining control, if the F/T is greater than the value obtained in the first or preceding brake pressure decreasing control is stable, this means that the preceding control decision value is too small, so that mild pressure control is effected in accordance with a twentieth embodiment and the F/T value in continues the decrease, it is decided that it is moving in the unstable direction, so that the pressure decreasing control is effected in accordance with a twenty first embodiment of the invention. If the F/T value is small and stable, this means that the friction force F available from the road surface is on the increase, so that the mild pressure control or increase is effected in accordance with a twenty second embodiment when F/T becomes smaller than the value obtained during the first brake pressure decreasing control and is stabilized.

In a twenty third embodiment, according to the approximate equation of motion shown below $$I \cdot \frac{d\omega}{dt} = k1 \cdot F - k2 \cdot T$$

from the moment of inertia I of the wheel and F and T multiplied by the proportionality constants k1 and k2, respectively, the F-T value is a value proportional to the wheel acceleration dω/dt. This can be used as a wheel speed sensor. Thus, there has been realized a wheel speed sensor capable of real time sensing which has eliminated the drawback of being lacking in response (the slower the sensing, the worse this situation) which is characteristic of the conventional gear-like wheel speed sensor. both the slip ratio control based on the wheel speed according to the prior art and the control decision based on F or μ according to the present invention are made possible by a single sensor.

In all embodiments described above, F/T has been used, but substantially the same result can also be obtained by using μ/T. However, since μ=F/T, the load moving component of the vehicle is included in μ.

The invention claimed is:

1. A method of detecting a control point where brake pressure is shifted from a pressure increasing mode to a pressure retaining or decreasing mode, upon emergency braking of a vehicle having an ABS which comprises:
    providing a stress sensor providing an output proportional to road surface friction force F or road surface friction coefficient μ having mixed therein a crosstalk component proportional to brake torque T;
    making an adjustment of brake pressure after a rise of brake pressure initiated at a start of the emergency braking such that detected signals of F or μ and T are adjusted in ratio or made equal in value, and
    deciding the control point of the adjustment based on a detected ratio of the detected signals of F or μ and T, wherein the timing of the control point is detected by size of a change in the ratio of detected signals of F or μ and T.

2. The method of claim 1 wherein a point of time when said ratio of the detected signals of F or μ and T substantially stops changing is decided to be the control point.

3. The method of claim 1 wherein the adjustment is a brake pressure decreasing control and a point of time, when said ratio of the detected signals of F or μ and T during brake pressure decreasing control becomes substantially equal to a value obtained upon completion of a preceding brake pressure decreasing control, or,
    when said ratio of the detected signals of F or μ and T during the brake pressure decreasing control becomes greater than a value obtained during a first brake pressure decreasing control, or,
    when said ratio of the detected signals of F or μ and T during the brake pressure decreasing control starts to increase,
    is decided to be a control timing for completion of the brake pressure decreasing control.

4. The method of claim 1 wherein a point of time,
    when said ratio of the detected signals of F or μ and T, except during brake pressure decreasing control, becomes just above a value obtained during a first brake pressure decreasing control, or,
    when said ratio of the detected signals of F or μ and T during brake pressure retaining control becomes smaller than a value obtained during a first brake pressure decreasing control and becomes further smaller,
    is decided to be a start of control timing for brake pressure decreasing control.

5. The method of claim 1 wherein a point of time, when said ratio of the detected signals of F or μ and T during brake pressure retaining control becomes greater than a value obtained, during a first brake pressure decreasing control, is decided to be a start of brake pressurization control.

6. The method of claim 1 wherein a point of time, when said ratio of the detected signals of F or μ and T during brake pressure retaining control becomes smaller than a value obtained during a first brake pressure decreasing control and is stabilized, is decided to be a continuation of brake pressure retention or a start of control of gentle increase.

7. The method of claim 1, wherein the timing for the control point is detected by a change in the F-T value after its adjustment or during brake control.

8. The method of claim 1, wherein a threshold value for the F-T value is provided to decided the control point.

9. The method of claim 8, wherein said threshold value is corrected as the road surface friction coefficient changes to detect the timing for the control point.

* * * * *